United States Patent [19]

Lower et al.

[11] Patent Number: 4,688,388
[45] Date of Patent: Aug. 25, 1987

[54] SERVICE STATION FOR REFRIGERATION EQUIPMENT

[75] Inventors: Ralph C. Lower, Bryan; Kenneth W. Manz, Paulding; Gary P. Murray, Montpelier, all of Ohio

[73] Assignee: Kent-Moore Corporation, Warren, Mich.

[21] Appl. No.: 728,589

[22] Filed: Apr. 29, 1985

[51] Int. Cl.$^4$ .............................................. F25B 49/00
[52] U.S. Cl. ........................................ 62/126; 62/149; 62/292
[58] Field of Search .................. 62/149, 77, 292, 127, 62/126

[56] References Cited

U.S. PATENT DOCUMENTS

| | | |
|---|---|---|
| 2,425,844 | 8/1947 | Spaulding . |
| 2,499,170 | 2/1950 | Shoemaker . |
| 2,746,258 | 5/1956 | Hagans . |
| 3,076,319 | 2/1963 | White . |
| 3,695,055 | 10/1972 | Bruce . |
| 3,785,163 | 1/1974 | Wagner . |
| 3,813,893 | 6/1974 | Gemender et al. . |
| 3,873,289 | 3/1975 | White . |
| 4,245,480 | 1/1981 | Saunders . |
| 4,261,178 | 4/1981 | Cain . |
| 4,285,206 | 8/1981 | Koser ............................ 62/149 X |
| 4,364,236 | 12/1982 | Lower et al. . |
| 4,513,578 | 4/1985 | Proctor et al. . |

Primary Examiner—William E. Tapolcai
Attorney, Agent, or Firm—Barnes, Kisselle, Raisch, Choate, Whittemore & Hulbert

[57] ABSTRACT

Apparatus for service and recharge of refrigeration equipment, with particular application to automotive air conditioning equipment. A vacuum pump, and oil and refrigerant charge containers are housed within a portable enclosure and configured for selective connection by electrically operated solenoid valves to refrigeration equipment under service. The refrigerant and oil containers are carried by a scale which provides electrical outputs signals as a function of weight of refrigerant and oil remaining in the containers. A microprocessor-based controller receives the scale signals and control signals from an operator panel for automatically cycling through vacuum, oil charge and refrigerant charge stages in a programmed mode of operation. The microprocessor-based controller includes facility for operator programming of the vacuum time and oil and refrigerant charge quantities, and for self- or operator-implemented diagnostics. Operating conditions and stages are displayed at all times to the operator.

26 Claims, 15 Drawing Figures

Microfiche Appendix Included
(1 Microfiche, 31 Pages)

INITIALIZATION SUBROUTINE

PROGRAMMING SUBROUTINE

AUTOMATIC REFRIGERANT CHARGE SUBROUTINE

SERVICE STATION FOR REFRIGERATION EQUIPMENT

Reference is made to a microfiche appendix to this application consisting of one sheet of microfiche bearing thirty-one frames.

The present invention is directed to equipment for maintaining refrigeration systems, and more particularly to a service station for charging automotive air conditioners and like refrigeration equipment.

BACKGROUND AND OBJECTS OF THE INVENTION

Service apparatus for automotive air conditioning systems and like refrigeration equipment heretofore proposed in the art typically include a vacuum pump, a source of lubricant under pressure and a source of refrigerant under pressure, all adapted for selective connection to the equipment under service. In automated service apparatus, the service apparatus is first connected to refrigeration equipment to be charged, and then vacuum time, and oil and refrigerant quantities are set by the operator. The latter are typically accomplished by manipulation of calibrated dials on the apparatus operator panel. Vacuum time depends upon the capacity of the refrigeration equipment under service and the efficiency of the apparatus vacuum pump. For automotive air conditioning system, vacuum time may be on the order of twenty to thirty minutes. Oil and refrigerant charges also depends on system capacity and are specified by the manufacturer. One to ten ounces of oil and two and three-quarters pounds of refrigerant are typical for automotive systems.

When an automatic mode of operation is initiated, the vacuum pump is first operated for the time set to evacuate the refrigeration system under service. The pressurized oil source is then connected to the system for feeding thereto the quantity of oil set by the operator, and the pressurized refrigerant source is then connected to the system for feeding thereto the quantity of refrigerant set by the operator. Typically, the operator is not advised of progress during the successive stages of operation and, in the event of malfunction, is not apprised of the source of such malfunction. Furthermore, in the event of such malfunction or depletion of the oil or refrigerant supplies during a charge cycle, it is typically necessary to rebegin the entire process. Another problem in many prior art devices is difficulty of simply adding an incremental refrigerant charge when equipment under service simply has low refrigerant pressure but does not require a complete recharge. Thus, prior art apparatus are generally characterized by an absence of versatility and by difficulty of operation in use.

A general object of the present invention is to provide apparatus for servicing refrigeration equipment in which the charge variables—i.e. vacuum time, and oil and refrigerant quantities—may be readily programmed by the operator; which implements an automatic mode of operation wherein operating sequence and status is continually indicated to the operator at each stage of operation; which, in the event of malfunction, not only interrupts operation at the stage in which malfunction occurred, but also provides to the operator an error code indicative of the malfunction which occurred; which may either resume operation at the point at which malfunction occurred or rebegin the entire cycle, depending upon the nature of the malfunction; which includes facility for a manual mode of operation for testing apparatus operation; and which includes a multiplicity of self-test and diagnostic features.

A further object of the invention is to provide refrigeration equipment service apparatus of the described character which is economical to manufacture, and which may be easily used by unskilled or semi-skilled operators.

Yet another object of the invention is to provide apparatus of the described character in which a predetermined or preset quantity of refrigerant may be added to refrigeration equipment attached thereto independently of the automatic mode of operation and without requiring that the equipment be completely recharged.

SUMMARY OF THE INVENTION

In accordance with the present invention, a self-contained service station for charging refrigeration equipment includes a vacuum pump, a pressurized oil source and a pressurized refrigerant source adapted for selective connection by electronically controlled valves to refrigeration equipment under service. The oil and refrigerant sources are mounted on a scale which provides electronic signals to a microprocessor-based controller indicative of quantities of oil and refrigerant transferred to the refrigeration equipment. The controller is also coupled to display lamps separately indicative of vacuum, oil and refrigerant stages during each of the automatic, manual and programming modes of operation, to an alphanumeric display at which the operator can observe the charge variable during programming and decrementing variables during each stage of operation, to an operator keypad having separately labeled numeric and sequence control keys, and to a labeled sequence display for indicating mode of operation to the operator.

In the programming mode of operation selectable by an operator using the sequence control keys, time of operation of the vacuum pump and quantities of oil and refrigerant to be transferred to the refrigeration equipment are set using the numeric keys and displayed at the alphanumeric display, and then entered and stored in the controller if satisfactory. In an automatic service cycle, which is initiated by entering the automatic mode of operation, the programmed time of operation of the vacuum pump is initially shown at the alphanumeric display, and then decremented during pump operation to indicate actual progress of the vacuum stage to the operator. Likewise, during each of the oil and refrigerant transfer stages, the programmed quantities are initially shown on the alphanumeric display and decremented responsive to scale output signals to indicate actual oil and refrigerant transfer. In the event of malfunction, automatic operation is terminated and a corresponding error code is indicated at the alphanumeric display.

The sequence display indicates to the operator the mode of operation of the apparatus and is coordinated with the sequence control keys of the operator keypad to indicate the manner in which other operating modes may be initiated. In a manual mode of operation, each of the vacuum and refrigerant operating stages may be selectively sequenced by the operator for testing operation thereof. The operator may initiate transfer of a predetermined quantity of refrigerant at the sequence control keys independently of the automatic mode of operation and independently of the programmed quantity of refrigerant to be transferred to the refrigeration equipment during such automatic mode of operation. A scale test mode of operation may be initiated by the operator in which weight sensed by the scale is directly indicated at the alphanumeric display.

BRIEF DESCRIPTION OF THE DRAWINGS

The invention, together with additional objects, features and advantages thereof, will be best understood from the following description, the appended claims and the accompanying drawings in which:

DETAILED DESCRIPTION OF PREFERRED EMBODIMENTS

Figure 1:
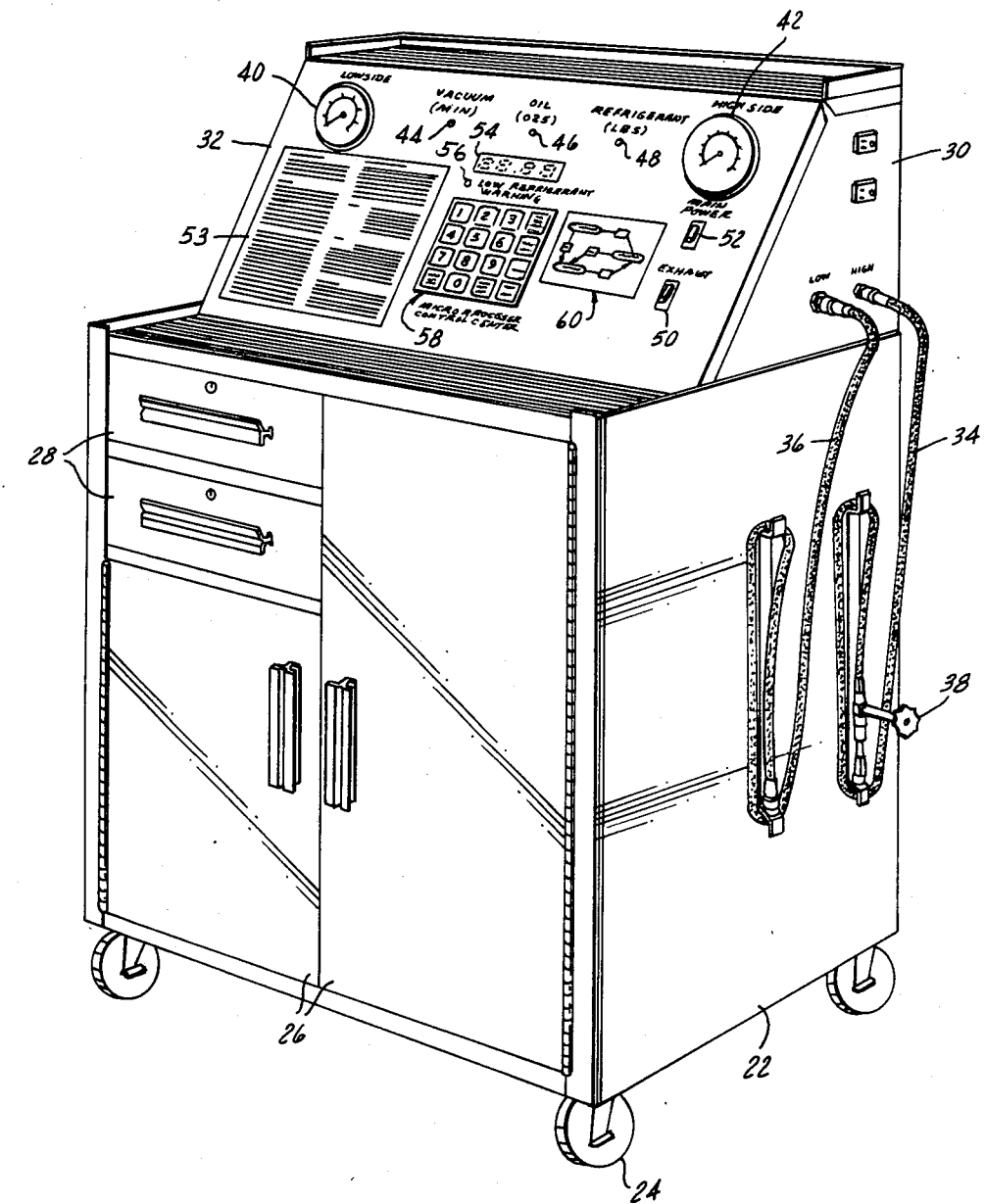
FIG. 1 is a perspective view of an automatic air conditioning service station embodying the principles of the present invention.

FIG. 1 illustrates a presently preferred embodiment 20 of service station apparatus in accordance with the invention as comprising a generally rectangular cabinet 22 mounted on the casters 24 for translation along the floor of a service center. A pair of hinged doors 26 provide access to the internal pumps and tanks (FIG. 3), and a pair of drawers 28 may hold suitable tools or other equipment. An electronics enclosure 30 is mounted on cabinet 22 and has a sloping front panel 32 with operator displays and switches mounted thereon. A pair of hoses 34,36 extend from a side wall of enclosure 30 for respective connection to the high pressure side and low pressure side of refrigeration equipment to be serviced. High side hose 34 includes a manual valve 38. Operator panel 32 has mounted thereon a LOW SIDE compound gage 40 (FIGS. 1 and 3) coupled to hose 36 for indicating low-side system pressure, and for indicating vacuum level during the vacuum stage of a charging cycle (to be described). Likewise, a HIGH SIDE pressure gage 42 is coupled to hose 34 for indicating high-side pressure of equipment under service. Three lamps 44,46 and 48 laterally spaced from each other between gages 40,42 respectively indicate VACUUM, OIL and REFRIGERANT stages of operation of the internal control circuitry, and are so labeled on panel 32. An EXHAUST switch 50 and a MAIN POWER switch 52 are also mounted on panel 32 beneath gage 42. A complete set 53 of printed operating instructions is mounted on panel 32 beneath gage 40.

Figure 2:
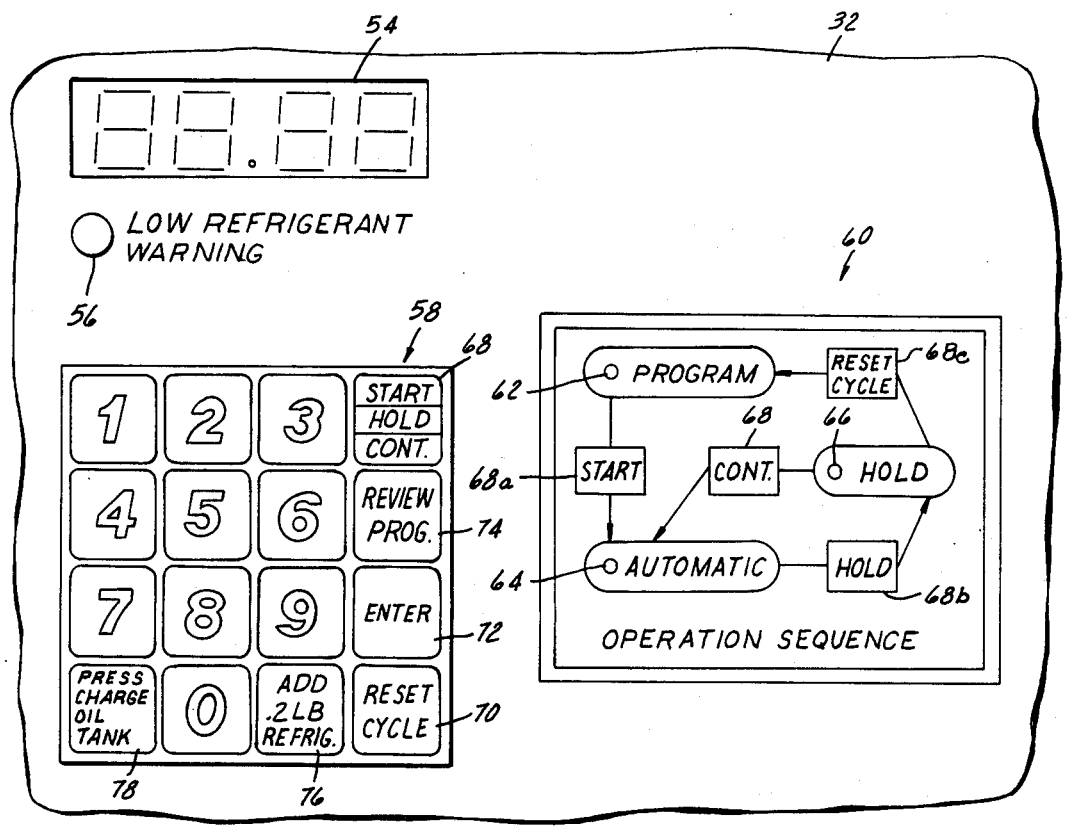
FIG. 2 is an enlarged fragmentary view of a portion of the control panel of the station of FIG. 1.

Referring now to both FIGS. 1 and 2, operator panel 32 further includes a four-digit seven-segment alphanumeric display 54, and an LED 56 beneath display 54 for indicating a LOW REFRIGERANT WARNING. A control keypad 58 beneath display 54 includes a plurality of numeric keys successively labeled "1" through "0", and a series of individually labeled sequence control keys. An operating sequence display 60 laterally adjacent to keypad 58 includes an LED 62 for indicating that the apparatus control electronics is in a PROGRAM mode of operation, a second LED 64 for indicating an AUTOMATIC mode of operation and a third LED 66 for indicating a HOLD status. Each LED 62-66 is positioned adjacent to printed indicia indicating the associated mode of operation. A three-function key 68 in keypad 58 is coordinated with functional indicia 68a,68b and 68c printed in sequence display 60 for changing modes of operation. More particularly, when the control electronics is in the PROGRAM mode and LED 62 is illuminated, depression of key 68 functions to START the AUTOMATIC mode of operation. When in the AUTOMATIC mode of operation with LED 64 illuminated, depression of key 68 functions to HOLD such AUTOMATIC operation and transfer the system to a HOLD or standby mode. In such HOLD or standby mode with LED 66 illuminated, depression of key 68 functions to CONTinue or return to the AUTOMATIC mode. A separate RESET CYCLE key 70 in keypad 58 transfers the control electronics from the HOLD mode to the PROGRAM mode. Keypad 58 further includes an ENTER key 72 for entering numeric data and a REVIEW PROGram key 74 for indexing to the next operating stage to review previously loaded data. A key 76 in keypad 58 functions (in the manner to be described) to ADD a predetermined amount of refrigerant, specifically 0.2 pounds, to the refrigeration equipment under test independently of the AUTOMATIC mode of operation. A further key 78 is employed during a setup operation to PRESSurize the oil reservoir.

Figure 3:
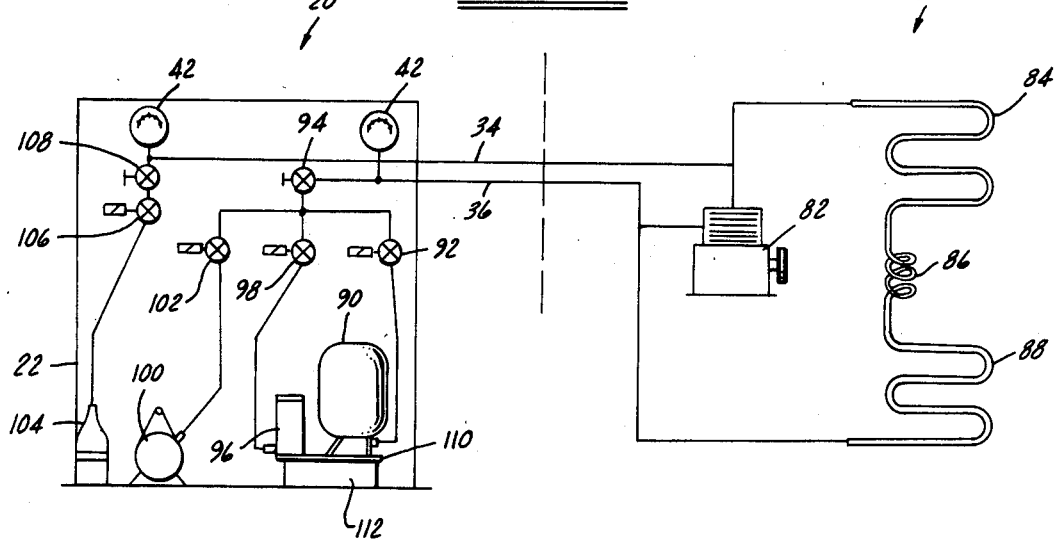
FIG. 3 is a schematic diagram of the vacuum and fluid transfer plumbing of the apparatus of FIG. 1 coupled to exemplary refrigeration equipment.

FIG. 3 illustrates the "plumbing" of station 20 connected to exemplary refrigeration equipment 80. In such equipment 80, a compressor 82 has a high pressure output connected through a condenser 84, a capillary tube 86 and an evaporator 88 to a low pressure return compressor input. (The preferred embodiment of the invention herein described is constructed and adapted specifically to service and recharge conventional automotive air conditioning equipment. However, it will be appreciated from the foregoing and following discussions that the principles of the invention apply equally as well to other types of refrigerant equipment 80, and the invention is not limited to any specific type of equipment or application.) Within cabinet 22, a bulk tank 90 containing refrigerant under pressure is connected through a solenoid-operated valve 92 and through a low pressure cut-out switch 94 to low side hose 36. A reservoir 96 of oil under pressure is likewise connected through an associated solenoid valve 98 to switch 94, and a vacuum pump 100 is connected through an associated solenoid valve 102 to switch 94. Switch 94 prevents operation of vacuum pump 100 without first exhausting refrigeration equipment 80. An oil catch bottle 104 is connected through a solenoid-operated exhaust valve 106 and through a high pressure cut-out switch 108 to high-side hose 34. Switch 108 has contacts connected to all valves 92,98,102,106 to prevent operation if the high-side pressure exceeds a preselected maximum level, such as three hundred seventy psig. It will be noted that gages 40,42 are connected directly to hoses 34,36 for observation of the pressures therein independently of cut-outs 94,108. Refrigerant tank 90 and oil reservoir 96 are mounted on a platform 110 which is carried by a scale 112, such as a strain gage or moving core scale. Scale 112 provides a d.c. output signal as a function of the weight of platform 110 with tank 90 and reservoir 96 carried thereon.

Figure 4:
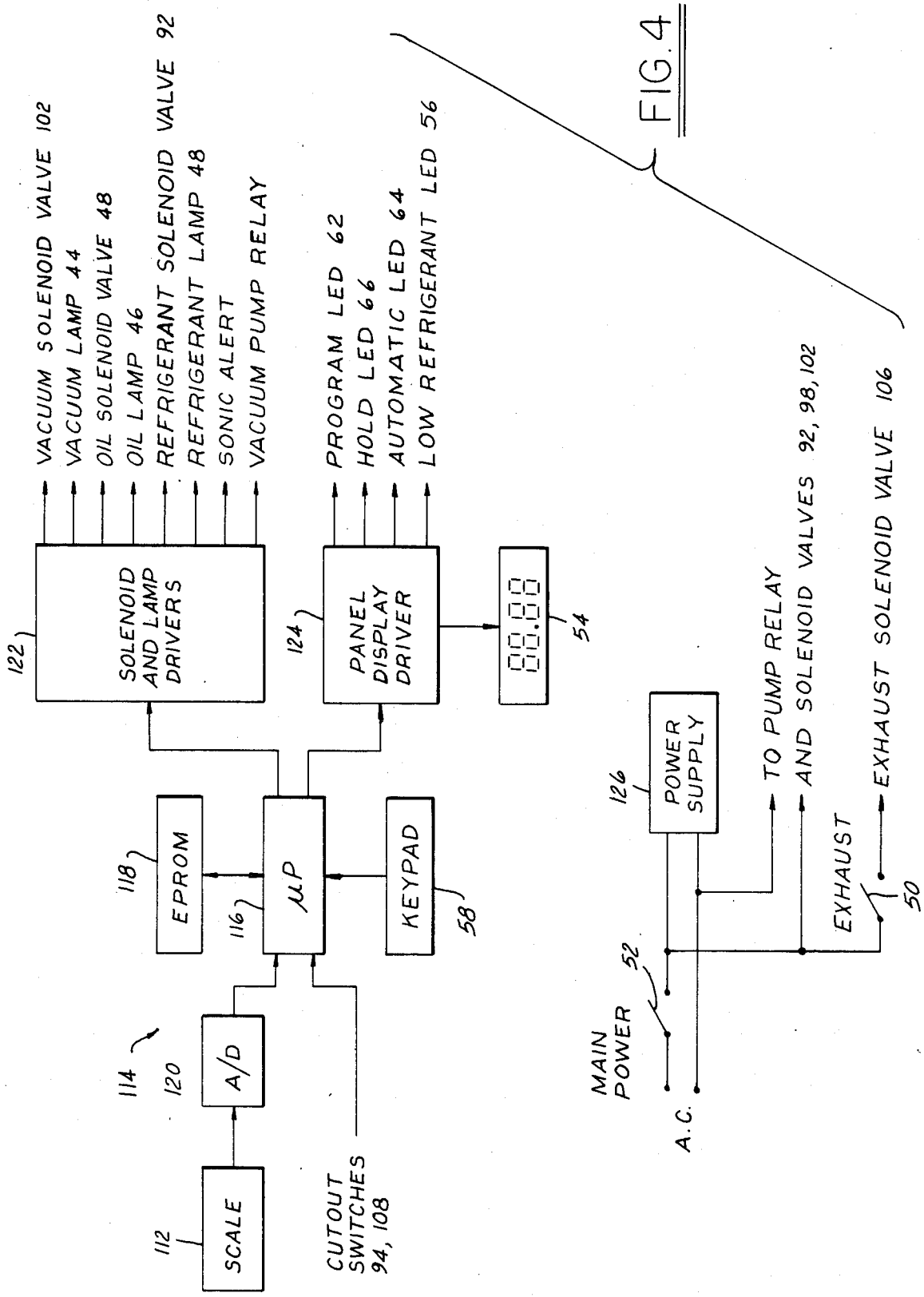
FIG. 4 is a functional block diagram of the automatic service station electronics in accordance with the present invention.

FIG. 4 illustrates the control electronics 114 of station 20 as comprising a microprocessor 116 having an associated EPROM 118 with microprocessor programming stored therein. Microprocessor 116 receives the output of scale 112 (FIGS. 3 and 4) through an a/d converter 120. Keypad 58 (FIGS. 1, 2 and 4) is likewise coupled to microprocessor 116. A series of solenoid and lamp drivers 122 receive associated control signals from microprocessor 116 and provide outputs to vacuum solenoid valve 102, oil solenoid valve 98 and refrigerant solenoid valve 92 (FIGS. 3 and 4), to VACUUM lamp 44, OIL lamp 46 and REFRIGERANT lamp 48 on operator panel 32 (FIGS. 1 and 4), and to a sonic alert and a vacuum pump relay (not shown). A panel display driver 124 receives control inputs from microprocessor 116 and provides corresponding display drive outputs to alphanumeric display 54, PROGRAM LED 62, HOLD LED 66, AUTOMATIC LED 64 and LOW REFRIGERANT WARNING LED 56 (FIGS. 1, 2 and 4). POWER switch 52 (FIGS. 1 and 4) applies a.c. power from a suitable utility power source (not shown) to a power supply 126 which powers the remainder of the control circuitry. Switch 52 also applies a.c. power to the pump relay (not shown), to solenoid valves 92,98,102, and through EXHAUST switch 50 (FIGS. 1 and 4) to exhaust solenoid valve 106 (FIG. 3).

In a working embodiment of the invention herein disclosed, microprocessor 116 includes a Motorola MC146805E2P microprocessor chip, together with a National Semiconductor 74LS139 decoder and a Motorola 74LS373 latch between the microprocessor chip and a/d converter 102. Drivers 122 include a Motorola MC1413 driver, together with suitable solenoid-drive solid state relays. EPROM 118 comprises a TI TMS2732AJL-35 4K × 8 bit EPROM. Converter 120 is an Intersil ICL7109 twelve bit converter. Display driver 124 is a National Semiconductor MM5450 module, and alphanumeric display 54 is a Panasonic LN516RA seven-segment display. The remaining elements of FIG. 4 may be of any suitable type. A program in machine language for operating control circuitry 114 in the manner to be described is provided in the appendix which forms part of this application.

In general, operation of automatic service station apparatus 20 hereinabove described proceeds by first connecting hoses 34,36 to the high pressure and low pressure sides of compressor 82 (FIG. 3) using couplings on the compressor provided for that purpose and any necessary adapter fittings. Gages 40,42 may be employed to determine whether the refrigeration system under service requires repair or recharging. Assuming that some additional charge or a complete recharge is required, power is then applied to station 20 by activation of switch 52 (FIGS. 1 and 4). If only some additional refrigerant charge is required to bring the equipment up to manufacturer specifications, and in accordance with a feature of the invention, key 76 (FIGS. 1 and 2) may be depressed one or more times while observing gages 40,42 until the specified pressures are obtained. Each depression of key 76 functions to ADD 0.2 pounds of refrigerant to the equipment.

If a complete recharge of refrigeration equipment 80 is required, switch 50 is first depressed by the operator to energize exhaust valve 106 and depressurize equipment 80. Programmed vacuum time and oil and refrigerant quantities are then reviewed and reprogrammed as required. (Microprocessor 116 has a battery backup for retaining stored data when POWER switch 52 is off.) Such review and reprogramming is accomplished in the PROGRAM mode of operation, necessitating depression of RESET CYCLE key 70 if required to place the system in the PROGRAM mode. If VACUUM lamp 44 (FIG. 1) is not illuminated, REVIEW PROGram key 74 is repeatedly depressed until lamp 44 is illuminated. Display 54 will then indicate vacuum time last stored in microprocessor 116. If such time is not that desired, the numeric data keys of keypad 58 are depressed in the appropriate sequence to set the desired vacuum time in minutes, which is simultaneously shown on display 54, and key 72 is depressed to ENTER the new vacuum time data. Display 54 will flash once to indicate that the reprogrammed data has been accepted. REVIEW PROGram key 74 is again depressed to extinguish VACUUM lamp 44 and illuminate OIL lamp 46, and the above process is repeated to set oil quantity in ounces. REVIEW PROGram key 74 is again depressed to extinguish OIL lamp 46 and illuminate REFRIGERANT lamp 48, and the process is again repeated to set refrigerant quantity in pounds. The data so entered may again be reviewed, if desired, by repeatedly depressing REVIEW PROGram key 74 to sequentially progress through the vacuum, oil and refrigerant stages, each of which is indicated in turn at lamps 44–48 with the corresponding data being shown at display 54.

When the operator is satisfied with the stored variables, and with EXHAUST switch 50 off, three-function key 68 is depressed to initiate or START the AUTOMATIC mode of operation from the PROGRAM mode. VACUUM lamp 44 is then illuminated and, after a slight delay, solenoid valve 102 (FIG. 3) is energized and pump 100 is activated. Vacuum pump operating time is simultaneously displayed at 54, initially at the programmed time and thereafter decrementing or counting down to zero, at which point pump 100 is deenergized and valve 102 is closed. Apparatus 20 then automatically assumes a HOLD mode, during which LOW SIDE pressure gage 40 may be observed by the operator for loss of vacuum, indicating a leak in refrigeration equipment 80. If the gage reading is satisfactory, key 68 is depressed to CONTinue the AUTOMATIC mode of operation. (As will be described in detail hereinafter, the automatic HOLD feature after the vacuum stage may be overridden by depression of the "1" key of pad 58 during the vacuum stage, in which event the system will proceed immediately to the oil charging stage following termination of the vacuum stage.) Upon return to the AUTOMATIC mode of operation, the oil charging stage begins, OIL lamp 46 is illuminated and the oil charge quantity in ounces is indicated at display 54. This charge display is decremented as charging proceeds as a function of weight loss at scale 112. Apparatus 20 then proceeds automatically to the refrigerant charging stage, at which REFRIGERANT lamp 48 is illuminated and the refrigerant charge quantity in pounds is indicated and decremented at display 54. The end of the AUTOMATIC mode is signaled by a display of "CPL" at display 54, and apparatus 20 automatically enters a HOLD mode wherein LED 66 (FIG. 2) is illuminated and all lamps 44–48 are extinguished.

If problems are encountered during the AUTOMATIC mode of operation, the operator may enter the HOLD mode at any time by depressing key 68. Either or both refrigerant tank 90 and oil reservoir 96 (FIG. 3) may be changed or filled in the HOLD mode. Depression of key 68 functions to return to or CONTinue the AUTOMATIC mode where the operator was interrupted. In the event of malfunction at apparatus 20, microprocessor 116 (FIG. 4) diagnoses the cause or source of such malfunction and indicates at display 54 an error code which corresponds to such malfunction. These error codes are also listed on panel instruction set 53 (FIG. 1) and may be employed by the operator for correcting or repairing the source of error. The error codes and corresponding malfunctions are listed in the following table:

TABLE I

| Error Code | Cause |
|---|---|
| ERR 1 | Low Memory Battery |
| ERR 2 | Power Interruption |
| ERR 3 | Invalid Oil Entry |
| ERR 4 | Invalid Refrigerant Entry |
| ERR 5 | Overloaded or Broken Scale |
| ERR 6 | Low Side Manifold Pressure too high (above 25 psig) |
| ERR 7 | High Side Manifold Pressure too high (above 370 psig) |

Figure 5:
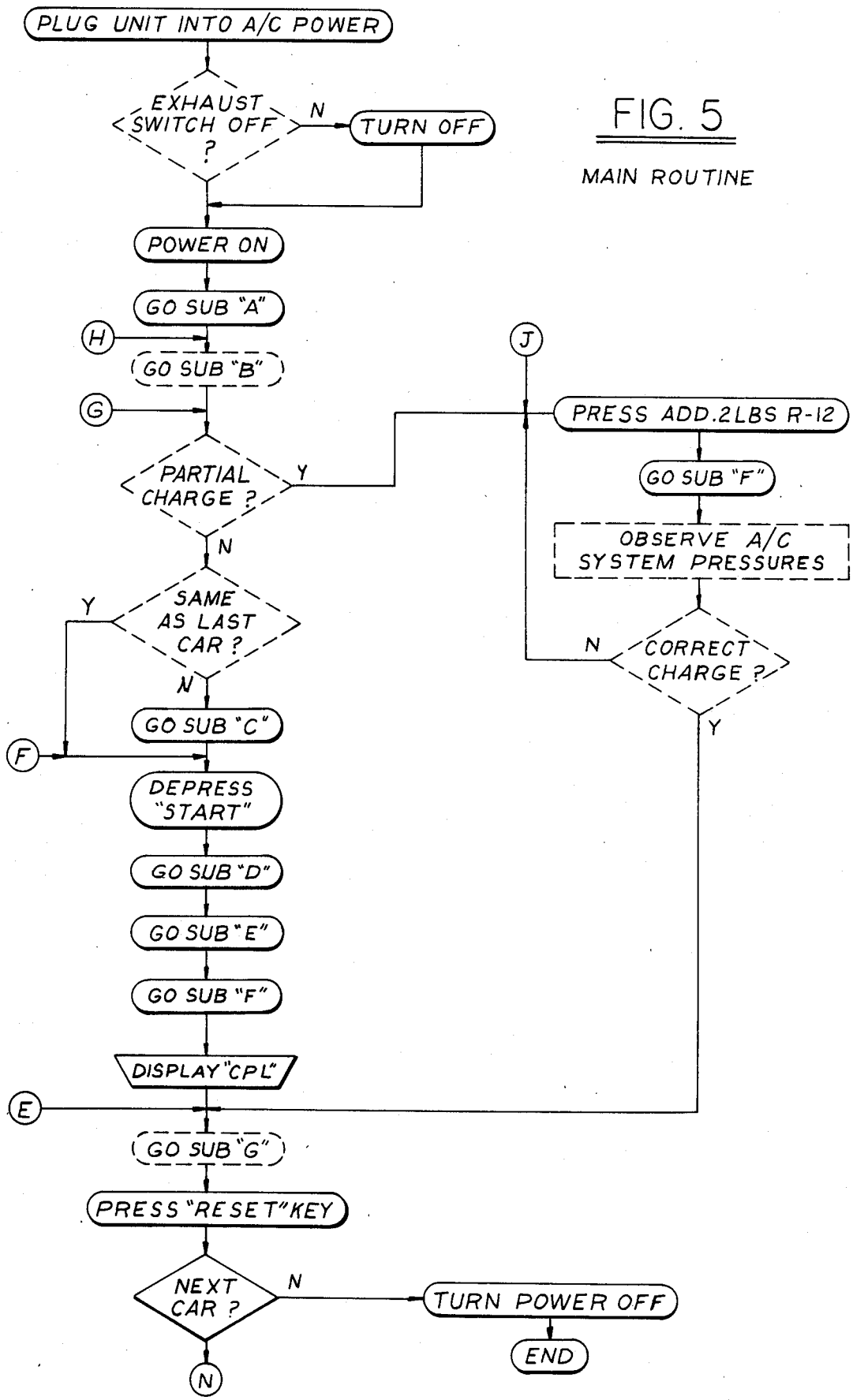
FIGS. 5-15 are composite flow charts which illustrate operator activity and programmed operation of the automatic service station system in accordance with the present invention.

FIGS. 5-15 together comprise a composite flow chart which illustrates detailed operation of the preferred embodiment of the invention hereinabove disclosed. FIG. 5 illustrates the main operating routine, while FIGS. 6-15 illustrate operation of subroutines. In FIGS. 5-15, operator action away from service apparatus 20 is illustrated in dashed or phantom lines, while operator action on or relating directly to the apparatus of the invention, as well as steps taken by the internal control microprocessor, are illustrated in solid lines. It will be appreciated, of course, that FIGS. 5-15 do not attempt to teach the art of refrigeration system service or repair. Rather, operator actions indicated in the flow chart are by way of example only.

Figure 6:
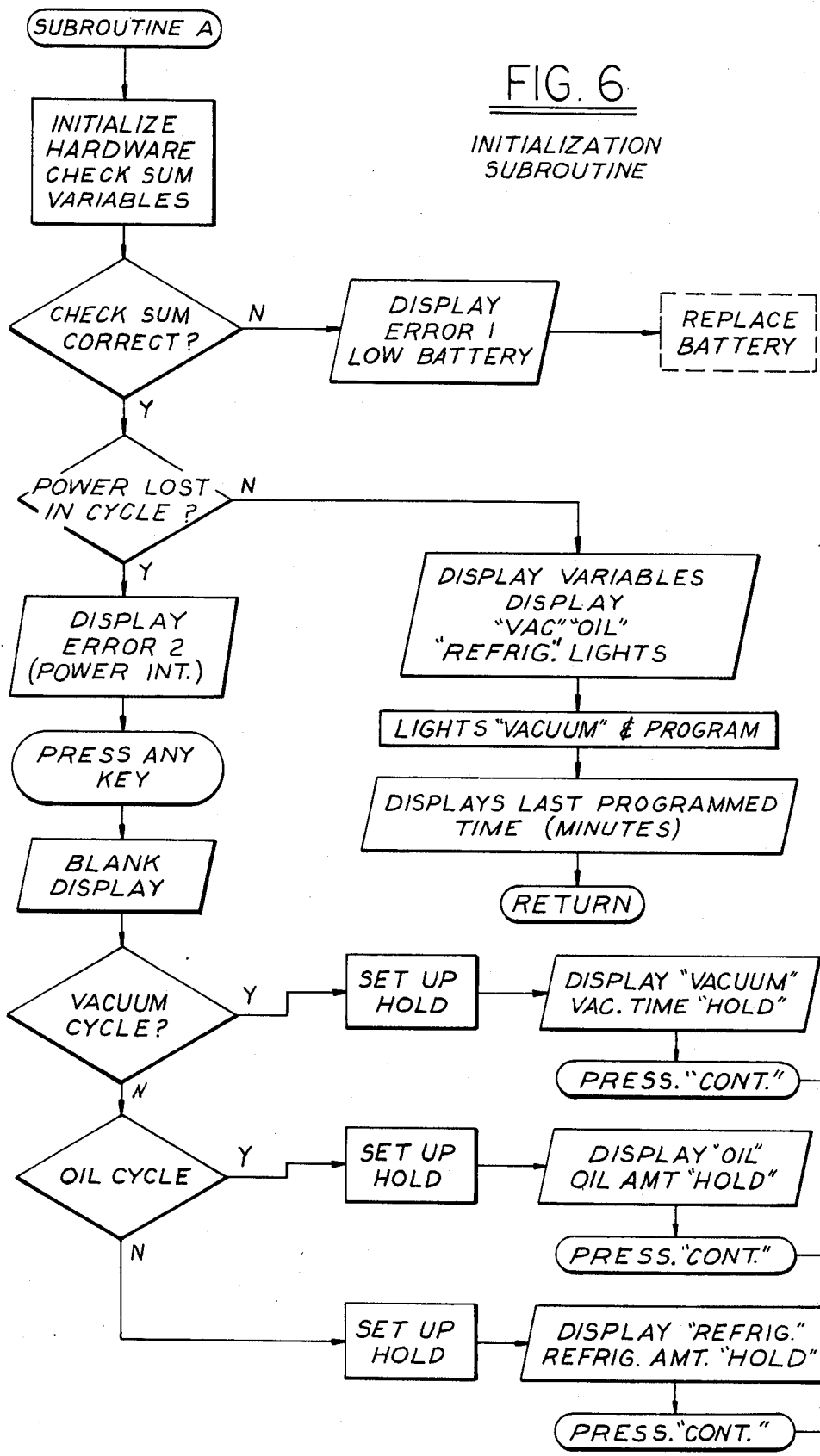

Turning to FIG. 5, with the unit power cable (not shown) plugged into a suitable source of utility power and with EXHAUST switch 50 (FIG. 1) turned off, MAIN POWER switch 52 is activated and operation transfers to an initialization Subroutine A (FIG. 6). Within the initialization subroutine, an internal routine within microprocessor 116 performs a variables checksum and, if a checksum error results, displays error code ERR 1 to indicate low memory battery power. The memory battery is replaced in the event of a low battery power error code. If the checksum initialization routine yields no error, microprocessor 116 then automatically checks to see if power was lost during a charging cycle. In the event that such interruption did occur, error code ERR 2 is indicated at display 54. Upon depression of any key in pad 58, the cycle stage at which power was interrupted, i.e. the vacuum, oil or refrigerant stage, is identified. The corresponding lamp 44,46,48 is energized, and vacuum time, oil quantity or refrigerant quantity remaining when the power was lost is indicated at display 54 as is appropriate. The unit then automatically enters the HOLD mode and energizes LED 66 (FIG. 2). Depression of key 68 in pad 58 will then CONTinue the AUTOMATIC mode of operation at the stage in which the cycle was interrupted—i.e. the automatic vacuum, oil or refrigerant subroutine of FIGS. 9, 10 or 11. If power was not interrupted during a service cycle, the last-entered vacuum, oil and refrigerant variables are shown in sequence at display 54, coupled with illumination of corresponding lamps 44,46,48. The internal program then automatically initializes at the vacuum stage of the PROGRAM mode, displays the last-entered programmed vacuum time in minutes, and returns to the main routine (FIG. 5).

Figure 7:
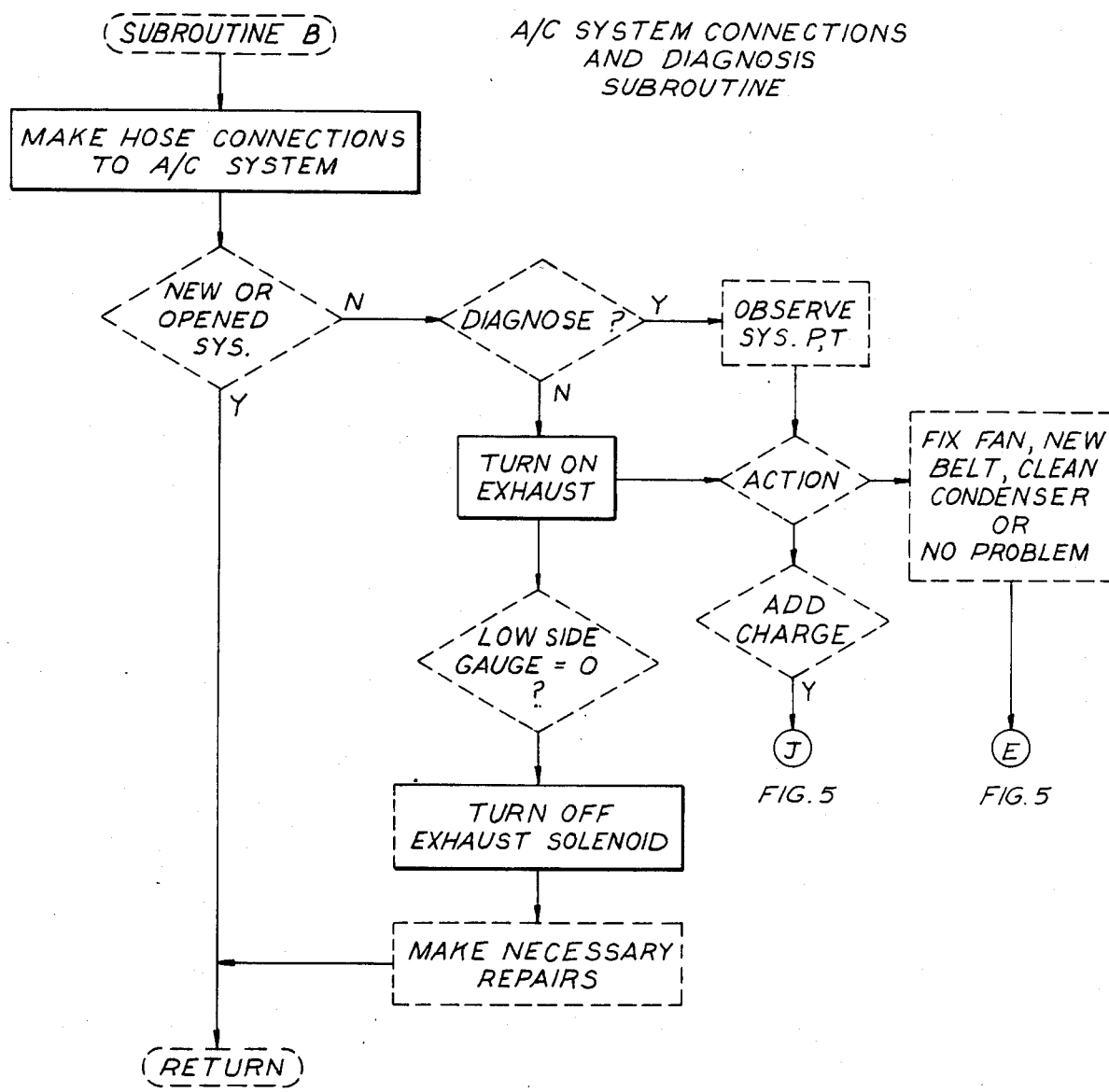
Figure 12:
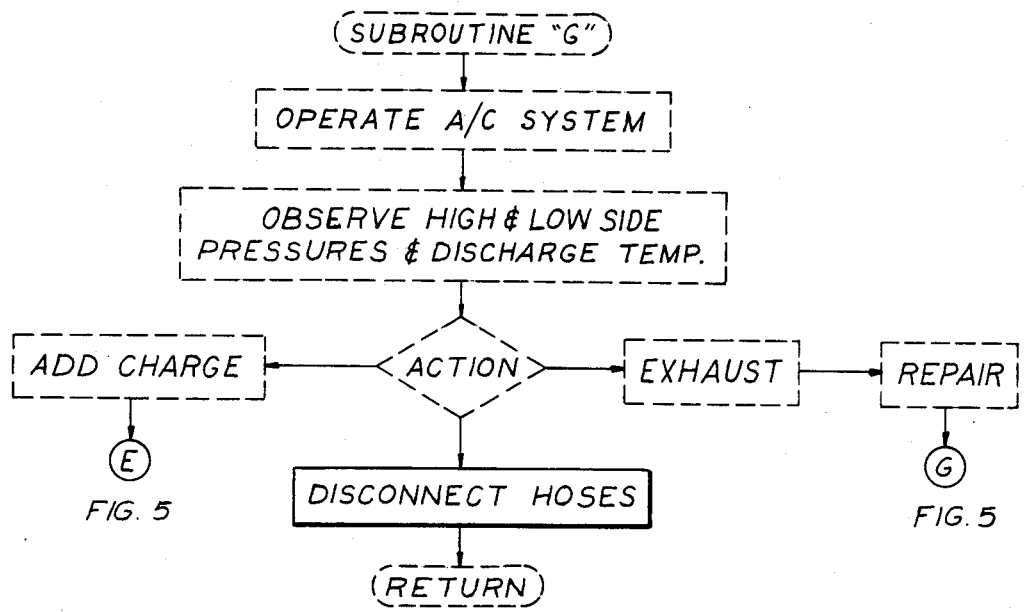

FIG. 7 illustrates Subroutine B which must be performed by the operator before charging refrigeration equipment 80 (FIG. 3), specifically an automotive air conditioner or a/c system in the exemplary implementation. Hoses 34,36 (FIG. 1) are appropriately connected to the a/c system as hereinabove described. If the a/c system is newly installed or has been opened or breached for repair purposes, further repair may not be necessary and the operator may proceed with the main service routine. On the other hand, the operator must decide if system diagnosis and possible repair are required. If not, EXHAUST switch 50 is activated until the pressure at LOW SIDE gage 40 indicates that the a/c system has been fully exhausted, at which time switch 50 is turned off and operation returns to the main routine. When system repair is required, the operator diagnoses the problem and takes appropriate action. If the required repair does not involve breach of the a/c system, such as repair of the fan, replacement of the compressor belt or cleaning of the condenser, no further action need be taken on the system, and operation branches to final system check and hose disconnect Subroutine G (FIG. 12). Alternatively, the required repair action may necessitate partial or complete recharge, whereby operation returns to the main routine (FIG. 5).

Figure 11:
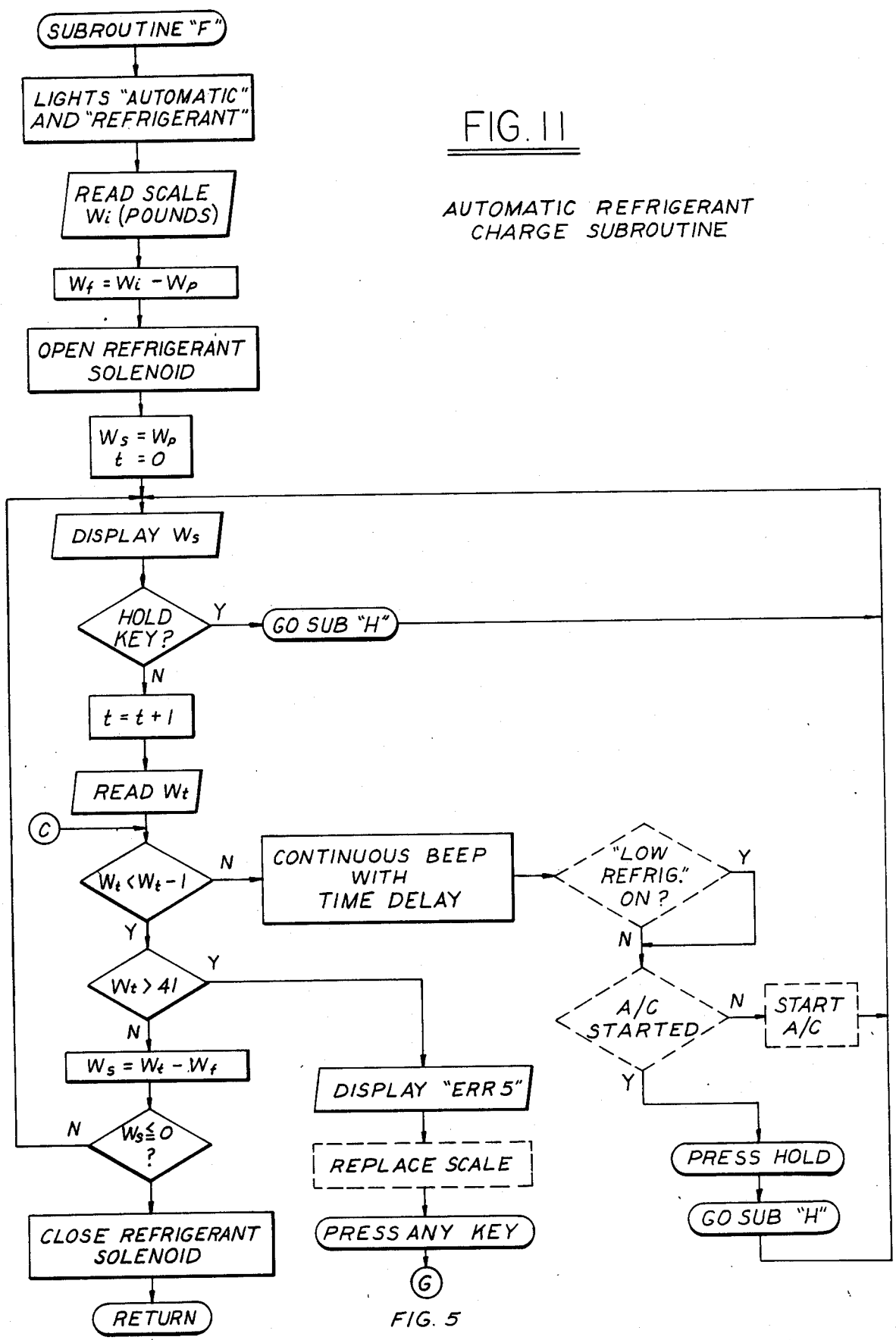

Returning to FIG. 5, when a partial or incremental charge is to be added, which is an operator decision based upon a/c system pressures, key 76 (FIG. 2) of pad 58 is depressed, and control electronics 114 (FIG. 4) automatically opens refrigerant solenoid 92 and adds 0.2 pounds of refrigerant (subroutine F, FIG. 11). The operator may then observe the resulting pressures at gages 40,42 (FIG. 1) and, if the new pressure readings remain low, repeat the charge addition cycle. On the other hand, if the charge is now satisfactory, RESET CYCLE key 70 is depressed, hoses 34,36 are disconnected and the system is ready for servicing the next car. If the a/c system under service requires a complete recharge, i.e., not a mere partial charge, the operator must then determine whether the required vacuum time and oil and refrigerant charge quantities are the same as those for the last-serviced car. This may be accomplished by entering the PROGRAM mode of operation and depressing key 74 of pad 58 to review the stored variables, which are to be compared with manufacturer's specifications for the system under test. If the variables are to remain unchanged, key 68 is depressed to START the AUTOMATIC mode of operation. On the other hand, if the required variables are not the same as for the last-serviced car, operation branches to Subroutine C of FIG. 8.

Figure 8:
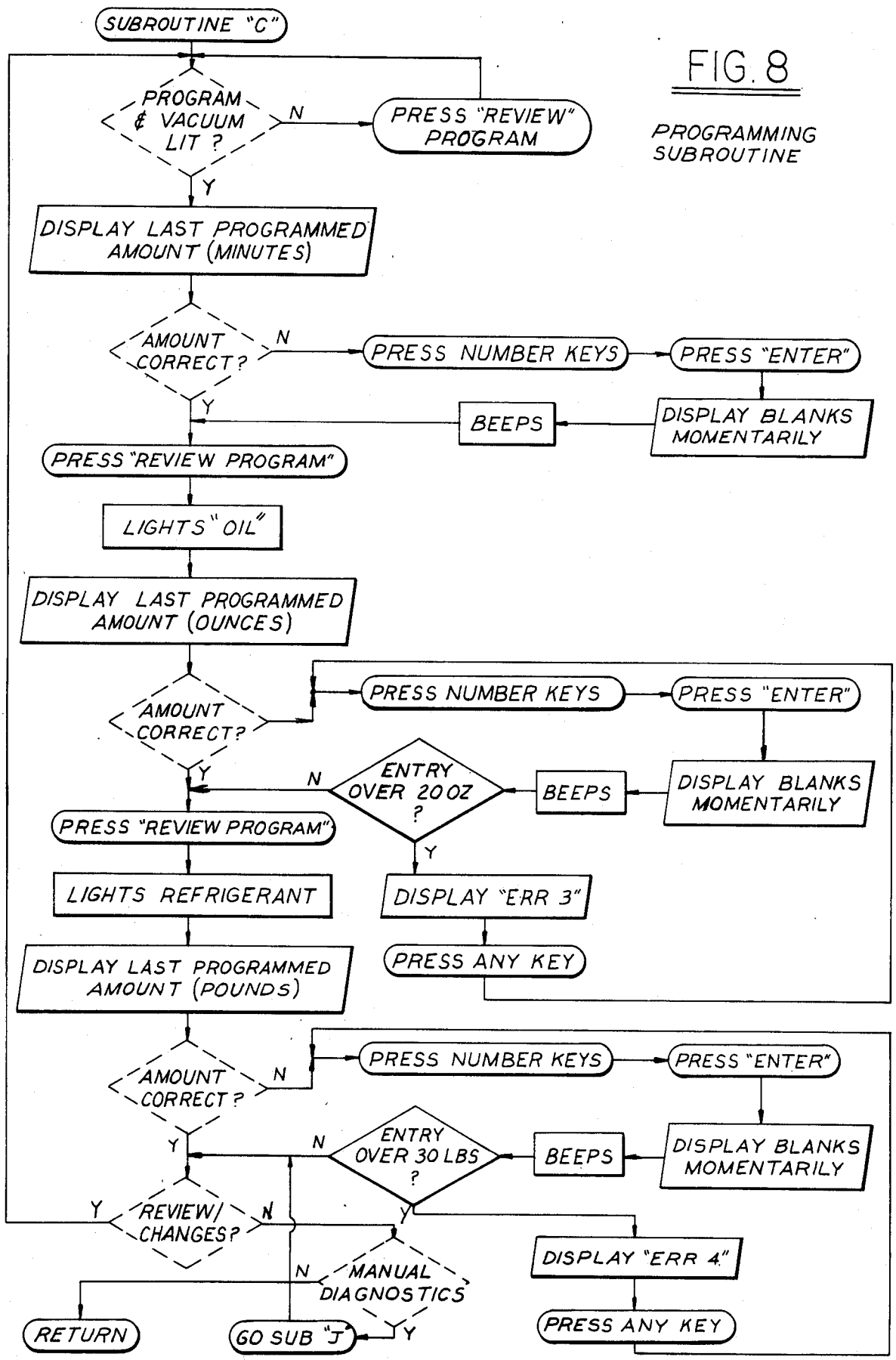

Turning to FIG. 8, with the system in the PROGRAM mode, REVIEW PROgram key 74 (FIG. 7) is depressed until VACUUM lamp 44 is illuminated and the previously-stored vacuum time in minutes is indicated at display 54. If the time so displayed is incorrect, appropriate numerical data keys of pad 54 are depressed and ENTER key 72 is then depressed to enter the new vacuum time. Display 54 flashes momentarily and the sonic alarm beeps to indicate acceptance of the new data. REVIEW PROGram key 74 is then again depressed to illuminate OIL lamp 46 and display last-programmed oil charge quantity in ounces at display 54. If this amount is incorrect, appropriate numeric keys of pad 58 are depressed, ENTER key 72 is depressed, the display blinks and the sonic alarm beeps to indicate entry of the new oil quantity. If the entered quantity is greater than a twenty ounce maximum limit, error code ERR 3 is shown at display 54. Depression of any key on pad 58 will exit the error display mode, and desired oil quantity may then be re-entered. If the entered or re-entered quantity is not over the twenty ounce limit, REVIEW PROGram key 74 is depressed, REFRIGERANT lamp 48 is illuminated and the last-programmed refrigerant charge quantity in pounds is displayed. If this amount is incorrect, the refrigerant charge quantity is reprogrammed in the manner previously described. In the event that the newly-entered charge quantity is over a thirty pound maximum limit, error code ERR 4 is displayed. The newly-entered data may be reviewed, or operation returned to the main routine of FIG. 5.

Figure 9:
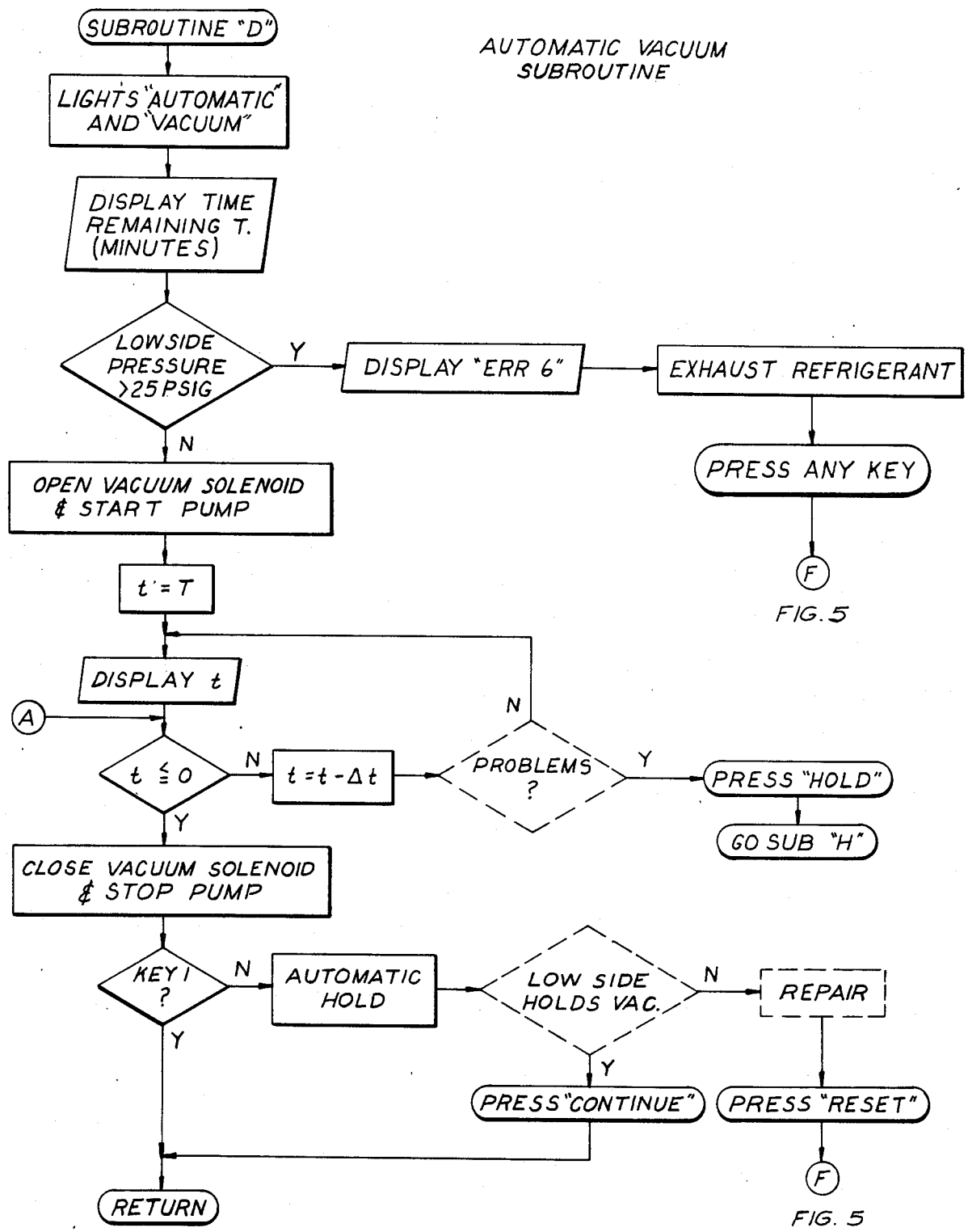

With all variables entered or confirmed as previously described, and upon depression of key 68 to START the AUTOMATIC mode of operation, operation automatically branches from the main routine of FIG. 5 to vacuum Subroutine D of FIG. 9. AUTOMATIC LED 64 and VACUUM lamp 44 are illuminated, and the programmed vacuum time in minutes is indicated at display 54. If the low-side pressure indicated at gage 44 is greater than twenty-five psig, indicating that equipment 80 (FIG. 3) has not been fully exhausted, error code ERR 6 is indicated at display 54. Equipment 80 may then be exhausted by depression of switch 50. Depression of any key on pad 58 returns the system to the PROGRAM mode and to the main routine of FIG. 5, requiring redepression of key 68 to reSTART the AUTOMATIC mode of operation. If low-side pressure is not greater than twenty-five psig (FIG. 9), vacuum solenoid valve 102 and vacuum pump 100 (FIG. 3) are energized. Vacuum time is indicated on display 54 initially at the programmed level and thereafter decremented as a function of time as pump operation continues. If the operator notes any operating problems, depression of key 68 will HOLD the AUTOMATIC mode of operation and enter the HOLD mode, wherein repairs or changes may be affected per Subroutine H of FIG. 13. If no such problems are encountered, vacuum operation continues until vacuum time is decremented to zero, at which point solenoid valve 102 and pump 100 are deenergized. If numeric key "1" of pad 58 was depressed during the automatic vacuum stage, operation immediately returns to the main routine of FIG. 5 for initiation of the automatic oil subroutine. If key "1" was not so depressed, operation automatically enters the HOLD mode in which gages 40,42 may be observed to confirm that the a/c system under service holds a vacuum. If such is the case, depression of key 68 returns to or CONTinues the AUTOMATIC mode of operation. If vacuum is not held, appropriate repairs are effected and RESET CYCLE key 70 is depressed and then key 68 is depressed to reSTART the AUTOMATIC mode.

Figure 10:
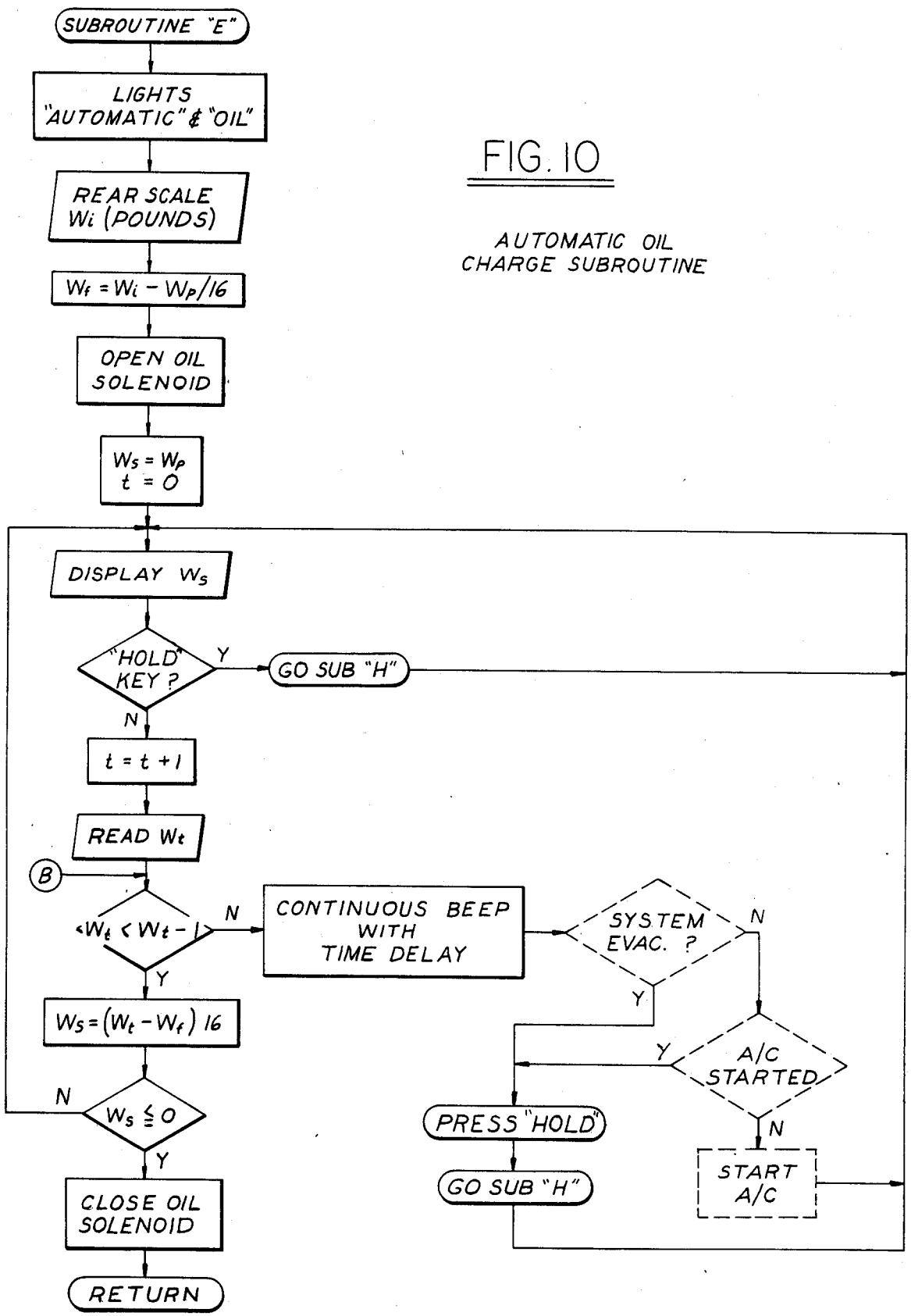

Automatic oil charge Subroutine E is illustrated in FIG. 10. AUTOMATIC LED 64 and OIL lamp 46 are illuminated. An initial reading Wi in pounds is obtained from scale 112 (FIG. 3) and a final weight Wf is computed by subtracting the programmed charge quantity Wp from the initial scale reading Wi. (The programmed charge Wp in ounces is divided by sixteen.) A variable quantity Ws, indicative of oil charge remaining to be transferred, is initialized at the programmed quantity Wp, oil solenoid valve 98 (FIG. 3) is opened and charge time t is initialized at zero. The remaining charge quantity Ws is shown at display 54. Time t is incremented and scale weight Wt is again read. In the event that the new scale reading is not less than the scale reading at the preceding time interval, indicating either a problem with the equipment under test or an empty oil reservoir 96, the sonic alert is activated. If the system under service has been evacuated, key 68 is depressed to HOLD the AUTOMATIC mode, and operation branches to Subroutine H of FIG. 13. If the system under test was not evacuated, the system is started to see if it will then accept oil charge. If the sonic alert continues, key 68 is depressed to HOLD AUTOMATIC operation. However, if the system now accepts charge, the sonic alarm is extinguished and operation remains AUTOMATIC. The amount of oil remaining to be transferred Ws is appropriately decremented and operation continues. When the weight of charge transferred equals the initially programmed amount, i.e., when Ws equals zero, oil solenoid valve 98 is closed and operation returns to the main routine of FIG. 5. At any time during the automatic oil charging subroutine, key 68 may be depressed to HOLD the AUTOMATIC mode and branch to Subroutine H (FIG. 13).

Upon successful completion of oil charge Subroutine E of FIG. 10, the main routine of FIG. 5 branches to Subroutine F of FIG. 11 for automatic implementation of the refrigerant charge subroutine. Charge quantity Wp is set at the preprogrammed level in the AUTOMATIC mode and at 0.2 pounds in the partial charge mode. During the automatic refrigerant charge subroutine, each scale reading Wt is checked to insure that the scale reading is not over forty-one pounds. In the event that the scale reading is over forty-one pounds, error code ERR 5 is indicated at display 54, and the scale must then be replaced by the operator. Depression of any key on pad 58 returns operation to the main routine (FIG. 5) from which the entire automatic operation must be restarted, if appropriate. As a modification, which would eliminate a need to start the a/c system if refrigerant is not accepted, a heater or mechanical pump could be used to elevate pressure in the refrigerant tank, as is currently done in some applications. Otherwise, the automatic refrigerant charge subroutine of FIG. 11 is substantially the same as the automatic oil charge subroutine of FIG. 10 hereinabove described, and will not be described further. Upon successful completion of refrigerant charge Subroutine F, operation is returned to the main routine of FIG. 5, and completion code CPL is indicated on display 54. Operation branches to Subroutine G (FIG. 12) wherein the operator performs a final check on the serviced equipment. If problems are noted, appropriate action is taken, which may include incremental addition of charge, or exhaust and complete recharge of the entire a/c system. If correct operation is observed by the operator, the hoses 34,36 are disconnected from the serviced equipment and operation returns to the main routine of FIG. 5.

Figure 13:
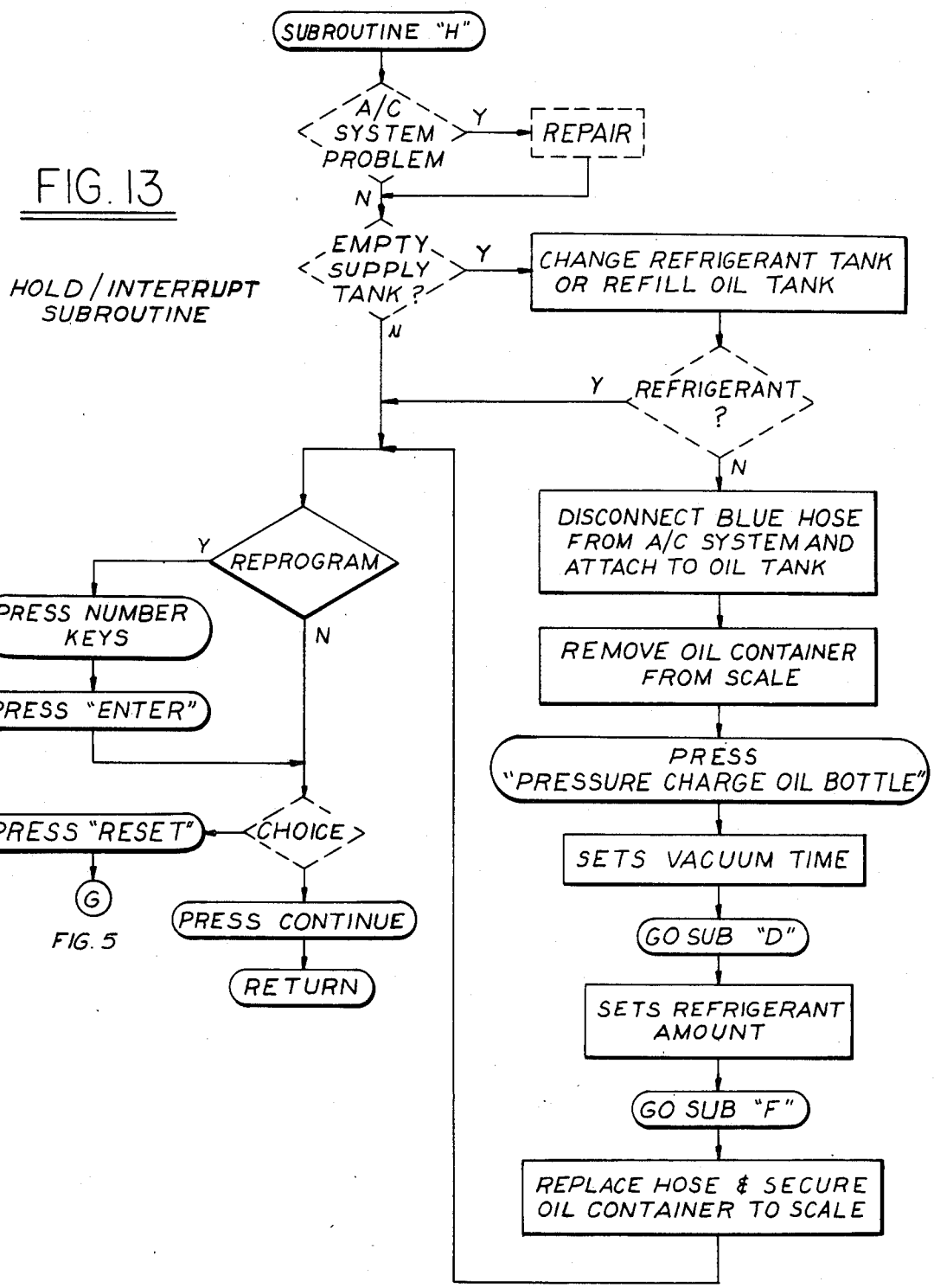

FIG. 13 illustrates operation of Subroutine H in the event of a HOLD or interrupt of the AUTOMATIC operating mode in any of the vacuum, oil or refrigerant cycles of FIGS. 9–11. In general, the oil and refrigerant supplies are checked by the operator, and replaced or refilled as required. If the oil reservoir 96 is refilled, it must be repressurized by operation of key 78 on pad 58. This is accomplished by first branching to Subroutine D (FIG. 9) for a preset time to pull a vacuum on oil reservoir 96, and then branching to Subroutine F (FIG. 11) to charge the oil reservoir with a selected quantity of refrigerant. With the oil and refrigerant containers checked and replaced or filled as required, the programmed variables may be reconsidered and reprogrammed if desired. The operator then either presses RESET CYCLE key 70 to restart the entire AUTOMATIC cycle, or presses key 68 to CONTinue and return operation to the Subroutine H branch point.

Figure 14:
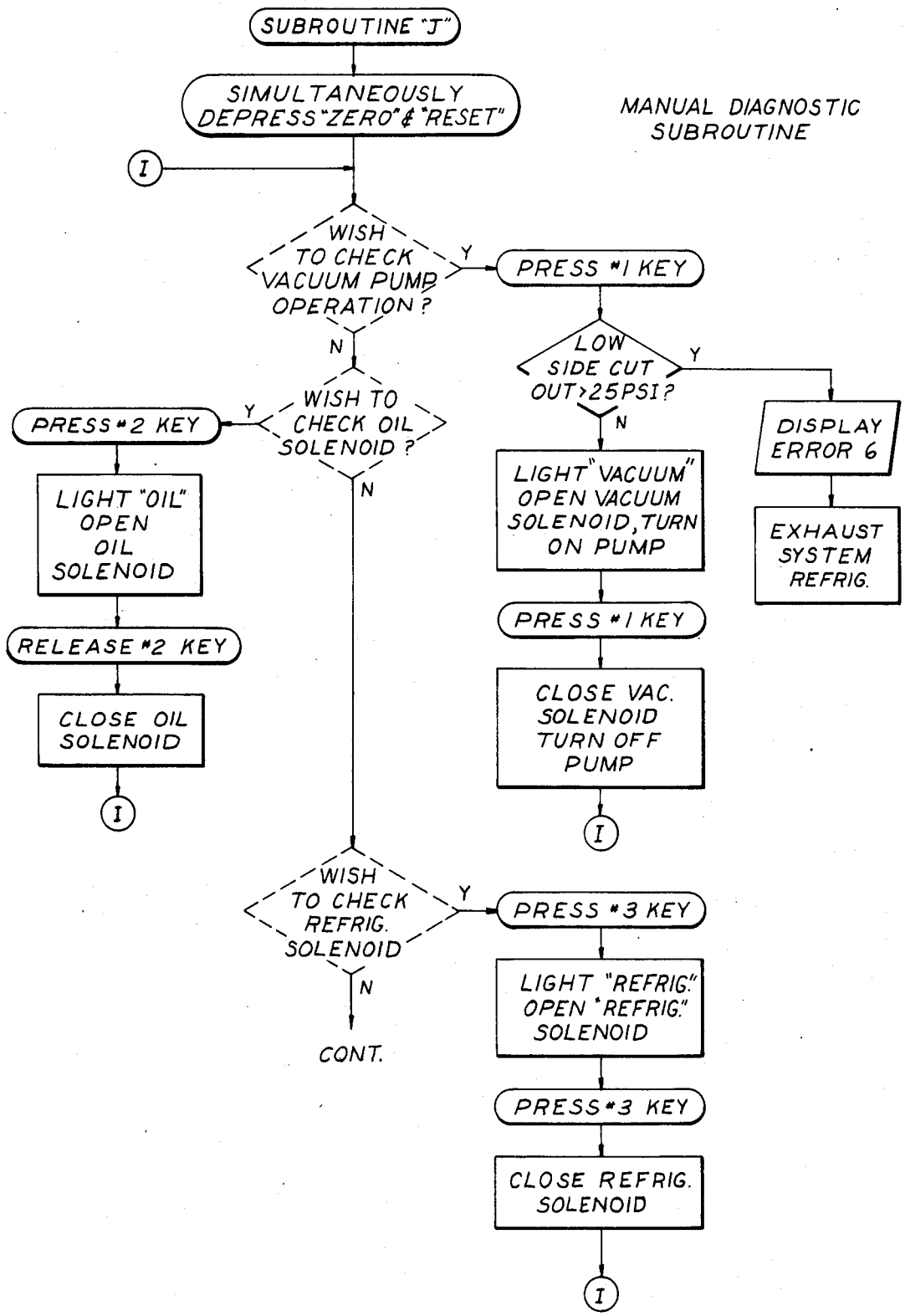
Figure 14:
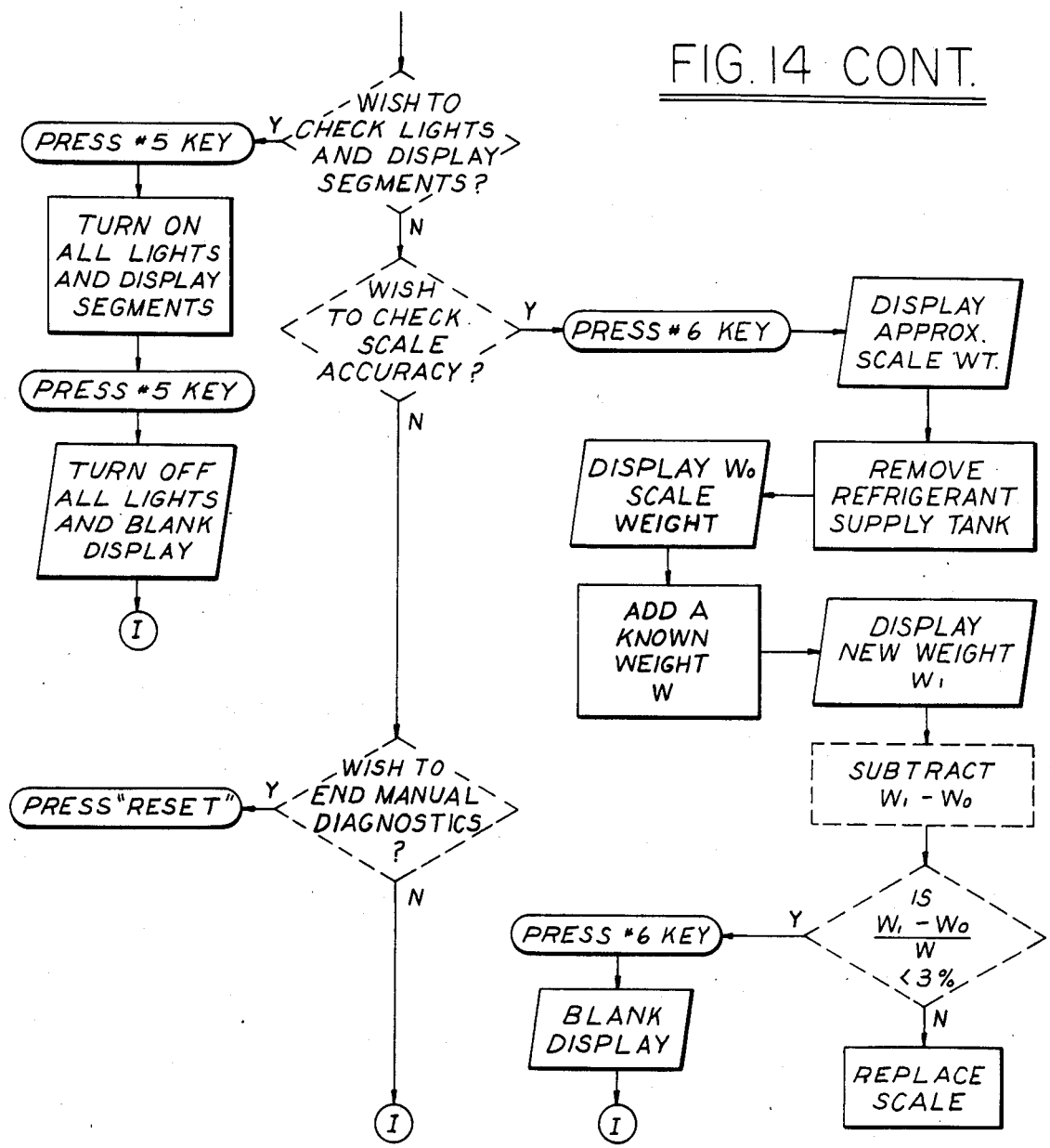

FIG. 14 illustrates operation of the manual diagnostic Subroutine J, which is entered by simultaneously depressing the "0" and RESET CYCLE keys of pad 58. If operation of vacuum pump 100 is to be tested, the numeric "1" key is depressed. If low-side pressure is in excess of twenty-five psig, error code ERR 6 is indicated at display 54, and the refrigeration equipment under test must be exhausted to continue operation. When low-side pressure is not greater than twenty-five psig, VACUUM lamp 44 is illuminated, and vacuum solenoid valve 102 and vacuum pump 100 are energized. Redepression of the "1" key closes the vacuum pump and solenoid valve, and extinguishes the VACUUM lamp. Depression and release of the numeral "2" key similarly energizes OIL lamp 46 and oil valve 98 for test purposes, while depression and release of the "3" key of pad 58 performs a similar check on refrigerant solenoid 92 and lamp 48. Key "5" tests all lamps 44-48, all LEDs 62-66 and all segments of display 54. Key "6" likewise enables test of scale 112 by directly indicating scale weight at display 54. The operator may test scale function by adding thereto a known weight and observing the result at display 54. If such result is in error by more than three percent, the scale should be replaced. When the manual diagnostic test has been completed, depression of RESET CYCLE key 70 returns the apparatus to the PROGRAM mode of operation.

Figure 15:
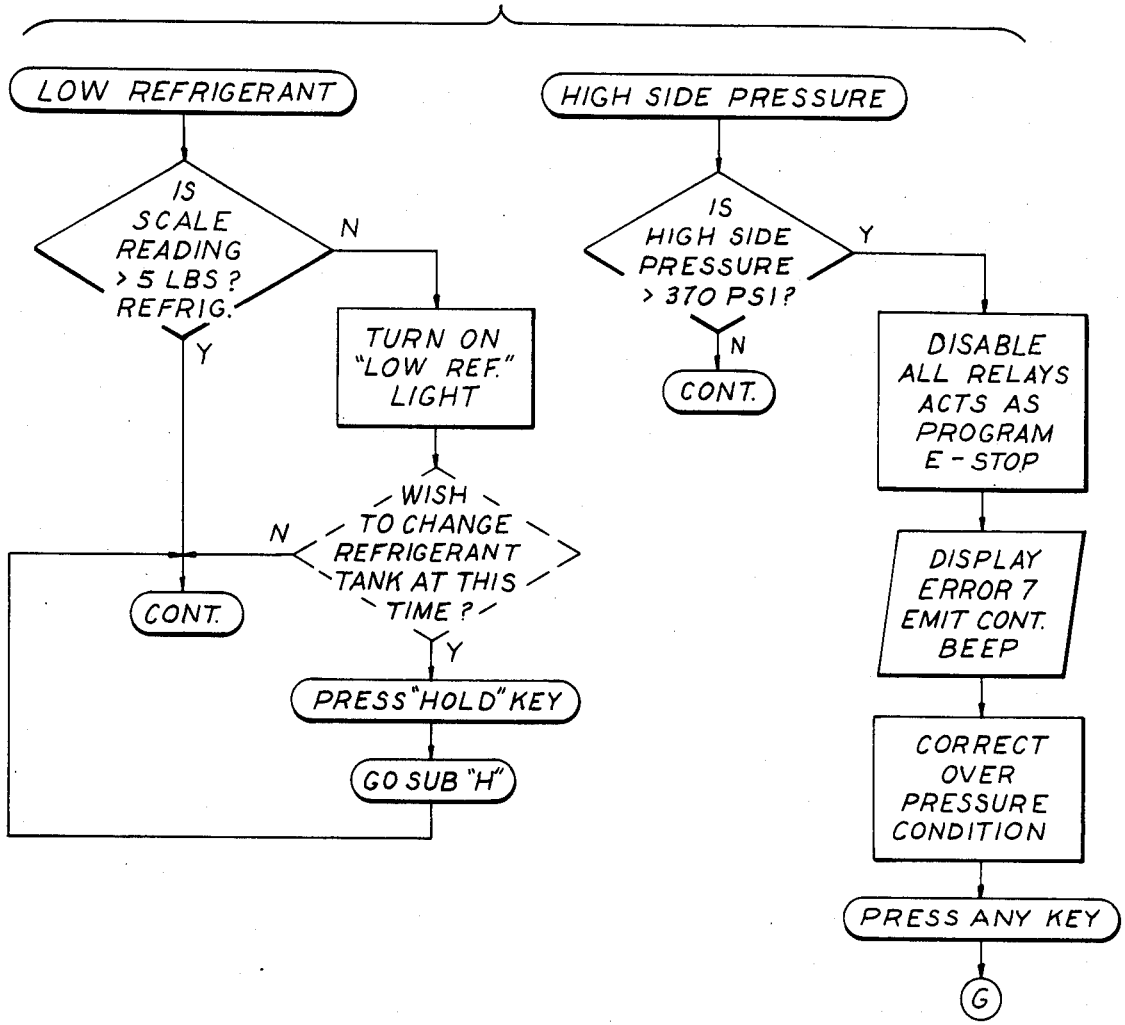

FIG. 15 illustrates operation of the low refrigerant and high pressure warning subroutines. Scale weight is constantly monitored during operation to determine if a low refrigerant warning is indicated, and high-side pressure is likewise continuously monitored. When the scale reading indicates that less than five pounds of refrigerant remains, LOW REFRIGERANT WARNING LED 56 is energized. Complete emptying of the tank is permitted while the lamp is lit. If the operator wishes to change refrigerant tank 90, key 68 is depressed to HOLD further operation, and operation branches to Subroutine H previously described. Likewise, a high-side pressure greater than three hundred seventy psig disables further operation and results in an error code ERR 7 at display 58. The sonic alert is continuously activated to advise the operator of an error indication. When the cause of the over-pressure condition has been corrected, depression of any key on pad 58 returns operation to the main routine of FIG. 5 wherein automatic operation must be reinitiated.

The invention claimed is:

1. Apparatus for charging refrigeration equipment comprising vacuum and charging means including a vacuum pump, a pressurized source of refrigerant and means for selectively connecting said vacuum pump and said pressurized refrigerant source to refrigeration equipment to be charged, control means including means in an automatic mode of operation for connecting said vacuum pump to the refrigeration equipment in a first stage of said automatic mode for a preselected time duration, and for connecting said pressurized refrigerant source to the refrigeration equipment in a second stage of said automatic mode to transfer a preselected quantity of refrigerant to the refrigeration equipment, data entry and sequence control means responsive to an operator, coupled to said control means and comprising an alphanumeric keypad having first keys associated with numeric data and second keys associated with sequence commands, said control means further including means in a programming mode of operation for receiving and storing data from said data entry and sequence control means indicative of said preselected time and said preselected quantity, means coupled to said control means and to said data entry and sequence control means for selectively initiating said automatic and programming mode of operation, sequence display means for indicating mode of operation of said control means to an operator and including means coordinated with said sequence command second keys for indicating to an operator ones of said sequence command second keys to be activated for transfer between said modes of operation, and alphanumeric display means coupled to said control means, said control means including means for displaying said preselected time and quantity at said alphanumeric display means in said programming mode of operation, and means in said automatic mode of operation for initially displaying in each of said first and second stages a corresponding said preselected time and quantity at said alphanumeric display means and for thereafter decrementing said display as a function of operation to indicate progress of the corresponding said stage.

2. Apparatus for charging refrigeration equipment comprising vacuum and charging means including a vacuum pump, a pressurized source of refrigerant and means for selectively connecting said vacuum pump and said pressurized refrigerant source to refrigeration equipment to be charged, control means including means in an automatic mode of operation for connecting said vacuum pump to the refrigeration equipment in a first stage of said automatic mode for a preselected time duration, and for connecting said pressurized refrigerant source to the refrigeration equipment in a second stage of said automatic mode to transfer a preselected quantity of refrigerant to the refrigeration equipment, data entry and sequence control means responsive to an operator and coupled to said control means, said control means further including means in a programming mode of operation for receiving and storing data from said data entry and sequence control means indicative of said preselected time and said preselected quantity, means coupled to said control means and to said data entry and sequence control means for selectively initiating said automatic and programming modes of operation, and alphanumeric display means coupled to said control means, said control means including means for displaying said preselected time and quantity at said alphanumeric display means in said programming mode of operation, and means for initially displaying in each of said first and second stages a corresponding said preselected time and quantity, and for thereafter decrementing said display as a function of operation to indicate progress of the corresponding said stage.

3. Apparatus for charging refrigeration equipment comprising vacuum and charging means including a vacuum pump, a pressurized source of refrigerant and means for selectively connecting said vacuum pump and said pressurized refrigerant source to refrigeration equipment to be charged, control means including means in an automatic mode of operation for connecting said vacuum pump to the refrigeration equipment in a first stage of said automatic mode for a preselected time duration, and for connecting said pressurized refrigerant source to the refrigeration equipment in a second stage of said automatic mode to transfer a preselected quantity of refrigerant to the refrigeration equipment, data entry and sequence control means responsive to an operator, coupled to said control means and comprising an alphanumeric keypad having first keys associated with numeric data and second keys associated with sequence commands, said control means further including means in a programming mode of operation for receiving and storing data from said data entry and sequence control means indicative of said preselected time and said preselected quantity, means coupled to said control means and to said data entry and sequence control means for selectively initiating said automatic and programming modes of operation, sequence display means for indicating mode of operation of said control means to an operator and including means coordinated with said sequence command second keys for indicating to an operator ones of said sequence command second keys to be activated for transfer between said modes of operation, and alphanumeric display means coupled to said control means, said control means including means for displaying said preselected time and quantity at said alphanumeric display means in both said automatic and said programming modes of operation, means for detecting malfunction of said apparatus, and means for displaying an error message at said alphanumeric display means corresponding to the detected malfunction.

4. The apparatus set forth in claim 3 wherein said control means further comprises means responsive to said malfunction detecting means in said automatic mode of operation and coupled to said keypad for reinitiating said automatic mode of operation at the stage at which the malfunction occurred.

5. Apparatus for charging refrigeration equipment comprising vacuum and charging means including a vacuum pump, a pressurized source of refrigerant and means for selectively connecting said vacuum pump and said pressurized refrigerant source to refrigeration equipment to be charged, control means including means in an automatic mode of operation for connecting said vacuum pump to the refrigeration equipment in a first stage of said automatic mode for a preselected time duration, and for connecting said pressurized refrigerant source to the refrigeration equipment in a second stage of said automatic mode to transfer a preselected quantity of refrigerant to the refrigeration equipment, data entry and sequence control means responsive to an operator and coupled to said control means, said control means further including means in a programming mode of operation for receiving and storing data from said data entry and sequence control means indicative of said preselected time and said preselected quantity, means coupled to said control means and to said data entry and sequence control means for selectively initiating said automatic and programming modes of operation, and alphanumeric display means coupled to said control means, said control means including means for displaying said preselected time and quantity at said alphanumeric display means in both said automatic and said programming modes of operation, means for detecting malfunction of said apparatus, and means for displaying an error message at said alphanumeric display means corresponding to the detected malfunction.

6. The apparatus set forth in claim 5 wherein said control means further comprises means responsive to said malfunction-detecting means in said automatic mode of operation and coupled to said keypad for reinitiating said automatic mode of operation at the stage at which the malfunction occurred.

7. Apparatus for charging refrigeration equipment comprising vacuum and charging means including a vacuum pump, a pressurized source of refrigerant and means for selectively connecting said vacuum pump and said pressurized refrigerant source to refrigeration equipment to be charged, control means including means in an automatic mode of operation for connecting said vacuum pump to the refrigeration equipment in a first stage of said automatic mode for a preselected time duration, and for connecting said pressurized refrigerant source to the refrigeration equipment in a second stage of said automatic mode to transfer a preselected quantity of refrigerant to the refrigeration equipment, data entry and sequence control means responsive to an operator, coupled to said control means and comprising an alphanumeric keypad having first keys associated with numeric data and second keys associated with sequence commands, said control means further including means in a programming mode of operation for receiving and storing data from said data entry and sequence control means indicative of said preselected time and said preselected quantity, means coupled to said control means and to said data entry and sequence control means for selectively initiating said automatic and programming modes of operation, sequence display means for indicating mode of operation of said control means to an operator and including means coordinated with said sequence command keys for indicating to an operator ones of said sequence command second keys to be activated for transfer between said modes of operation, and alphanumeric display means coupled to said control means, said control means including means for displaying said preselected time and quantity at said alphanumeric display means in both said automatic and said programming modes of operation, and means for indicating at said alphanumeric display means completion of said automatic mode of operation.

8. Apparatus for charging refrigeration equipment comprising vacuum and charging means including a vacuum pump, a pressurized source of refrigerant and means for selectively connecting said vacuum pump and said pressurized refrigerant source to refrigeration equipment to be charged, control means including means in an automatic mode of operation for connecting said vacuum pump to the refrigeration equipment in a first stage of said automatic mode for a preselected time duration, and for connecting said pressurized refrigerant source to the refrigerator equipment in a second stage of said automatic mode to transfer a preselected quantity of refrigerant to the refrigeration equipment, data entry and sequence control means responsive to an operator and coupled to said control means, said control means further including means in a programming mode of operation for receiving and storing data from said data entry and sequence control means indicative of said preselected time and said preselected quantity, means coupled to said control means and to said data entry and sequence control means for selectively initiating said automatic and programming modes of operation, and alphanumeric display means coupled to said control means, said control means including means for displaying said preselected time and quantity at said alphanumeric display means in both said automatic and said programming modes of operation, and means for indicating at said alphanumeric display means completion of said automatic control mode of operation.

9. Apparatus for charging refrigeration equipment comprising vacuum and charging means including a vacuum pump, a pressurized source of refrigerant and means for selectively connecting said vacuum pump and said pressurized refrigerant source to refrigeration equipment to be charged, control means including means in an automatic mode of operation for connecting said vacuum pump to the refrigeration equipment in a first stage of said automatic mode for a preselected time duration, and for connecting said pressurized refrigerant source to the refrigeration equipment in a second stage of said automatic mode to transfer a preselected quantity of refrigerant to the refrigeration equipment, data entry and sequence control means responsive to an operator, coupled to said control means and comprising an alphanumeric keypad having first keys associated with numeric data and second keys associated with sequence commands, said control means further including means in a programming mode of operation for receiving and storing data from said data entry and sequence control means indicative of said preselected time and said preselected quantity, means coupled to said control means and to said data entry and sequence control means for selectively initiating said automatic and programming modes of operation, sequence display means for indicating mode of operation of said control means to an operator and including means coordinated with said sequence command second keys for indicating to an operator ones of said sequence command second keys to be activated for transfer between said modes of operation, and alphanumeric display means coupled to said control means, said control means including means for displaying said preselected time and quantity at said alphanumeric display means in both said automatic and said programming modes of operation, and means distinct from said means operable in said automatic mode and responsive to said second keys for coupling said refrigerant source to the refrigeration equipment to transfer a predetermined quantity of refrigerant to the equipment independently of said automatic mode.

10. Apparatus for charging refrigeration equipment comprising vacuum and charging means including a vacuum pump, a pressurized source of refrigerant and means for selectively connecting said vacuum pump and said pressurized refrigerant source to refrigeration equipment to be charged, control means including means in an automatic mode of operation for connecting said vacuum pump to the refrigeration equipment in a first stage of said automatic mode for a preselected time duration, and for connecting said pressurized refrigerant source to the refrigeration equipment in a second stage of said automatic mode to transfer a preselected quantity of refrigerant to the refrigeration equipment, data entry and sequence control means responsive to an operator, coupled to said control means and comprising an alphanumeric keypad having first keys associated with numeric data and second keys associated with sequence commands, said control means further including means in a programming mode of operation for receiving and storing data from said data entry and sequence control means indicative of said preselected time and said preselected quantity, and means coupled to said control means and to said data entry and sequence control means for selectively initiating said automatic and programming modes of operation, said control means further comprising means distinct from said means operable in said automatic mode and responsive to said second keys for coupling said refrigerant source to the refrigeration equipment to transfer a predetermined quantity of refrigerant to the equipment independently of said automatic mode.

11. Apparatus for charging refrigeration equipment comprising vacuum and charging means including a vacuum pump, a pressurized source of oil, a pressurized source of refrigerant and means for selectively connecting said vacuum pump and said pressurized oil and refrigerant sources to refrigeration equipment to be charged;

an alphanumeric keypad mounted on an operator panel, said keypad containing a plurality of numeric data and sequence control keys;

an alphanumeric display mounted on said panel; and
control means including means in an automatic mode of operation for connecting said vacuum pump to the refrigeration equipment in a first stage of said automatic mode for a preselected time duration, for connecting said pressurized oil source to the refrigerator equipment in a second stage of said automatic mode to transfer a preselected quantity of oil under pressure to the refrigeration equipment, and for connecting said pressurized refrigerant source to the refrigeration equipment in a third stage of said automatic mode to transfer a preselected quantity of refrigerant to the refrigeration equipment,
means coupled to said keypad in a programming mode of operation for receiving and storing data indicative of said preselected time and said preselected quantities,
means coupled to said alphanumeric display means for displaying said preselected time and said preselected quantities at said display means in both said automatic and said programming modes of operation, said sequence control keys including means coupled to said control means for selectively initiating said automatic and programming modes of operation,
means for detecting malfunction of said apparatus, and
means for displaying an error message at said alphanumeric display means corresponding to the detected malfunction.

12. The apparatus set forth in claim 11 wherein said control means further comprises means responsive to said malfunction detecting means in said automatic mode of operation and coupled to said keypad for reinitiating said automatic mode of operation at the stage at which the malfunction occurred.

13. Apparatus for charging refrigeration equipment comprising
vacuum and charging means including a vacuum pump, a pressurized source of oil, a pressurized source of refrigerant and means for selectively connecting said vacuum pump and said pressurized oil and refrigerant sources to refrigeration equipment to be charged;
an alphanumeric keypad mounted on an operator panel, said keypad containing a plurality of numeric data and sequence control keys;
an alphanumeric display mounted on said panel; and
control means including means in an automatic mode of operation for connecting said vacuum pump to the refrigeration equipment in a first stage of said automatic mode for a preselected time duration, for connecting said pressurized oil source to the refrigeration equipment in a second stage of said automatic mode to transfer a preselected quantity of oil under pressure to the refrigeration equipment, and for connecting said pressurized refrigerant source to the refrigeration equipment in a third stage of said automatic mode to transfer a preselected quantity of refrigerant to the refrigeration equipment,
means coupled to said keypad in a programming mode of operation for receiving and storing data indicative of said preselected time and said preselected quantities,
means coupled to said alphanumeric display means for displaying said preselected time and said preselected quantities at said display means in both said automatic and said programming modes of operation, and
means for indicating at said alphanumeric display means completion of said automatic control mode of operation, said sequence control keys including means coupled to said control means for selectively initiating said automatic and programming modes of operation.

14. Apparatus for charging refrigeration equipment comprising
vacuum and charging means including a vacuum pump, a pressurized source of oil, a pressurized source of refrigerant and means for selectively connecting said vacuum pump and said pressurized oil and refrigerant sources to refrigeration equipment to be charged;
an alphanumeric keypad mounted on an operator panel, said keypad containing a plurality of numeric data and sequence control keys;
an alphanumeric display mounted on said panel; and
control means including means in an automatic mode of operation for connecting said vacuum pump to the refrigeration equipment in a first stage of said automatic mode for a preselected time duration, for connecting said pressurized oil source to the refrigeration equipment in a second stage of said automatic mode to transfer a preselected quantity of oil under pressure to the refrigeration equipment, and for connecting said pressurized refrigerant source to the refrigeration equipment in a third stage of said automatic mode to transfer a preselected quantity of refrigerant to the refrigeration equipment,
means coupled to said keypad in a programming mode of operation for receiving and storing data indicative of said preselected time and said preselected quantities,
means coupled to said alphanumeric display means for displaying said preselected time and said preselected quantities at said display means in both said automatic and said programming modes of operation, said sequence control keys including means coupled to said control means for selectively initiating said automatic and programming modes of operation, and
means distinct from said means operable in said automatic mode and responsive to said sequence control keys for coupling said refrigerant source to the refrigeration equipment to transfer a predetermined quantity of refrigerant to the equipment independently of said automatic mode.

15. Apparatus for charging refrigeration equipment comprising
vacuum and charging means including a vacuum pump, a pressurized source of refrigerant and means for selectively connecting said vacuum pump and said pressurized refrigerant source to refrigeration equipment to be charged,
control means including means in an automatic mode of operation for connecting said vacuum pump to the refrigeration equipment in a first stage of said automatic mode for a preselected time duration, and for connecting said pressurized refrigerant source to the refrigeration equipment in a second stage of said automatic mode to transfer a preselected quantity of refrigerant to the refrigeration equipment,
data entry and sequence control means responsive to an operator, coupled to said control means and comprising an alphanumeric keypad having first keys associated with numeric data and second keys associated with sequence commands, said control means further including means in a programming mode of operation for receiving and storing data from said data entry and sequence control means indicative of said preselected time and said preselected quantity, means coupled to said control means and to said data entry and sequence control means for selectively initiating said automatic and programming modes of operation, and sequence display means for indicating mode of operation of said control means to an operator, said sequence display means including means coordinated with said sequence command second keys for indicating to an operator ones of said sequence command second keys to be activated for transfer between said modes of operation.

16. The apparatus set forth in claim 15 further comprising alphanumeric display means coupled to said control means, said control means including means for displaying said preselected time and quantity at said alphanumeric display means in both said automatic and said programming modes of operation.

17. The apparatus set forth in claim 16 wherein said control means further comprises means operable in said automatic mode of operation for initially displaying in each of said first, second and third stages a corresponding said preselected time and quantity, and for thereafter decrementing said display as a function of operation to indicate progress of the corresponding said stage.

18. The apparatus set forth in claim 16 wherein said control means further comprises means for detecting malfunction of said system, and means for displaying an error message at said alphanumeric display means corresponding to the detected malfunction.

19. The apparatus set forth in claim 16 wherein said control means further comprises means for indicating at said alphanumeric display means completion of said automatic control mode of operation.

20. The apparatus set forth in claim 16 wherein said control means further comprises means distinct from said means operable in said automatic mode and responsive to said second keys for coupling said refrigerant source to the refrigeration equipment to transfer a predetermined quantity of refrigerant to the equipment independently of said automatic mode.

21. The appartus set forth in claim 16 further comprising scale means for providing to said control means signals indicative of weight on said scale means, said oil and refrigerant sources being mounted on said scale means, and means responsive to operator activation for initiating a scale test mode of operation, said control means including means operable in said scale test mode of operation and responsive to said signals for indicating weight on said scale means at said alphanumeric display means.

22. The apparatus set forth in claim 16 wherein said means in said programming mode of operation includes means for receiving and storing said data in successive stages of said programming mode corresponding to said successive stages in said automatic mode, and wherein said apparatus further comprises second display means for indicating to an operator each of said stages of operation in both said automatic mode and said programming mode.

23. The apparatus set forth in claim 15 wherein said control means further comprises means responsive to said data entry and sequence control means for initiating a manual mode of operation, and means operable in said manual mode of operation for selectively initiating any of said first, second and third stages of operation.

24. Apparatus for charging refrigeration equipment comprising vacuum and charging means including a vacuum pump, a pressurized source of refrigerant and means for selectively connecting said vacuum pump and said pressurized refrigerant source to refrigeration equipment to be charged, control means including means in an automatic mode of operation for connecting said vacuum pump to the refrigeration equipment in a first stage of said automatic mode for a preselected time duration, and for connecting said pressurized refrigerant source to the refrigeration equipment in a second stage of said automatic mode to transfer a preselected quantity of refrigerant to the refrigeration equipment, data entry and sequence control means responsive to an operator and coupled to said control means, said control means further including means in a programming mode of operation for receiving and storing data from said data entry and sequence control means indicative of said preselected time and said preselected quantity, and means coupled to said control means and to said data entry and sequence control means for selectively initiating said automatic and programming modes of operation, said control means including means for displaying said preselected time and quantity in both said automatic and said programming modes of operation, means for receiving and storing said data in successive stages of said programming mode corresponding to said successive stages in said automatic mode, and means in said programming mode for selectively reviewing said data in a sequence corresponding to said successive stages and for selectively reprogramming said data.

25. Apparatus for charging refrigeration equipment comprising vacuum and charging means including a vacuum pump, a pressurized source of refrigerant and means for selectively connecting said vacuum pump and said pressurized refrigerant source to refrigeration equipment to be charged, control means including means in an automatic mode of operation for connecting said vacuum pump to the refrigeration equipment in a first stage of said automatic mode for a preselected time duration, and for connecting said pressurized refrigerant source to the refrigeration equipment in a second stage of said automatic mode to transfer a preselected quantity of refrigerant to the refrigeration equipment, data entry and sequence control means responsive to an operator and coupled to said control means, said control means further including means in a programming mode of operation for receiving and storing data from said data entry and sequence control means indicative of said preselected time and said preselected quantity, means coupled to said control means and to said data entry and sequence control means for selectively initiating said automatic and programming modes of operation, alphanumeric display means coupled to said control means, said control means including means for displaying said preselected time and quantity at said alphanumeric display means in both said automatic and said programming modes of operation, and scale means for providing to said control means signals indicative of weight on said scale means, said refrigerant source being mounted on said scale means, and means responsive to operator activation for initiating a scale test mode of operation, said control means including means operable in said scale test mode of operation and responsive to said weight-indicative signals for indicating weight on said scale means at said alphanumeric display means.

26. The apparatus set forth in claim 25 further comprising means for monitoring quantity of refrigerant in said refrigerant source as a function of said weight-indicative signal, and means for indicating low refrigerant quantity to an operator when said weight-indicative signal is below a preselected threshold.

* * * * *